(12) United States Patent
Kuwabara et al.

(10) Patent No.: US 6,602,044 B1
(45) Date of Patent: Aug. 5, 2003

(54) PUMP TURBINE, METHOD OF CONTROLLING THEREOF, AND METHOD OF STOPPING THEREOF

(76) Inventors: Takao Kuwabara, c/o Hitachi, Ltd., Intellectual Property Group New Marunouchi Bldg. 5-1, Marunouchi 1-chome, Chiyoda-ku, Tokyo 100-8220 (JP); Kei Katayama, c/o Hitachi, Ltd., Intellectual Property Group New Marunouchi Bldg. 5-1, Marunouchi 1-chome, Chiyoda-ku, Tokyo 100-8220 (JP); Hiroto Nakagawa, c/o The Kansai Electric Power Co., Inc. 3-22, Nakanoshima 3-chome, Kita-ku, Osaka-shi, Osaka 530-8270 (JP); Haruki Hagiwara, c/o The Kansai Electric Power Co., Inc. 3-22, Nakanoshima 3-chome, Kita-ku, Osaka-shi, Osaka 530-8270 (JP)

( * ) Notice: Subject to any disclaimer, the term of this patent is extended or adjusted under 35 U.S.C. 154(b) by 111 days.

(21) Appl. No.: 09/697,285

(22) Filed: Oct. 27, 2000

(30) Foreign Application Priority Data

Oct. 29, 1999 (JP) .......................................... 11-308503
Oct. 29, 1999 (JP) .......................................... 11-308504

(51) Int. Cl.$^7$ ............................................. F04D 15/02
(52) U.S. Cl. ......................... 415/1; 415/30; 415/36
(58) Field of Search ........................... 415/1, 17, 30, 415/36, 151, 155, 160, 910; 416/44

(56) References Cited

U.S. PATENT DOCUMENTS

| | | | | |
|---|---|---|---|---|
| 4,253,794 A | * | 3/1981 | Kuwabara | 415/36 |
| 4,297,589 A | * | 10/1981 | Bashnin et al. | 415/30 |
| 4,382,745 A | * | 5/1983 | Kuwabara et al. | 415/910 |
| 4,625,125 A | * | 11/1986 | Kuwabara | 290/52 |
| 5,547,337 A | * | 8/1996 | Fork et al. | 415/17 |
| 5,953,902 A | * | 9/1999 | Jerye et al. | 60/39.281 |

FOREIGN PATENT DOCUMENTS

| | | |
|---|---|---|
| JP | 53-143841 | 12/1978 |
| JP | 53-143842 | 12/1978 |

* cited by examiner

Primary Examiner—Edward K. Look
Assistant Examiner—Richard A. Edgar

(57) ABSTRACT

A pump turbine includes a runner connected to a generator motor, a water discharge controller for adjusting the quantity of water passing through the runner and a governor for detecting a rotational speed of the runner and controlling the water discharge controller to get a predetermined rotational speed of the runner. Upon a load rejection which shuts off the generator motor from an electric power system, the governor is controlled to make a target speed value of the runner after a load rejection higher than a target speed value before the load rejection. The target speed value is a reference speed to be compared with actual speed so that the governor determines when or how to open or close a water discharge controller in response to a balance between the two speeds.

52 Claims, 32 Drawing Sheets

PUMP TURBINE, METHOD OF CONTROLLING THEREOF, AND METHOD OF STOPPING THEREOF

FIELD OF THE INVENTION

The present invention relates to a pump turbine using a runner to work as a pump and a turbine by changing the rotational direction of the runner, a method of controlling said pump turbine, and a method of stopping said pump turbine.

BACKGROUND OF THE INVENTION

Generally, the runner of a pump turbine, especially a high head pump turbine, is designed so as to realize a sufficient centrifugal pump action to obtain a high head during pump running.

However, this design adversely affects the turbine operation of the pump turbine. Especially when so-called S-characteristics appear as an example, it is considered to be difficult to avoid them perfectly.

It has been recognized that the S-characteristics are a bottleneck especially for high-head pump turbines in civil designing of upstream and downstream waterways, heights of installation elevation of pump turbines, and so on. Therefore, there have been various proposals to control such S-characteristics. For example, Japanese Non-examined Patent Publication S53-143842 (1988) proposes a method of temporarily opening guide vanes of a pump turbine while the running point of the pump turbine is moving along a flowrate decreasing direction on the S characteristics after a load rejection and quickly closing the guide vanes when the running point of the pump turbine starts to move along a flowrate increasing direction on the S characteristics or when the flowrate becomes almost zero, as shown in the accompanying FIG. 1.

However, this proposal is designed to reduce the rotational speed (which temporarily increased after a load rejection) straight down to a predetermined rotational speed or its vicinity which is determined by a governor setting. For this purpose, the temporarily-opened guide vanes are closed as quickly as the sudden closing after a load rejection instead of using the so-called buckling manner which changes limitation of the closing speed of the guide vanes from the "fastest" rate to a "slow" rate when the opening of the guide vanes Y is smaller than Ya. This is very dangerous in case the S-characteristics controller is disabled. Further this proposal assumes that the temporarily-opened guide vanes start to close when the flowrate starts to increase (from the end of decreasing) or when the flowrate becomes almost zero. However, it is very difficult to detect a flow rate finely (at high resolution) and timely in the transient status of the pump turbine. Even if a high-resolution flowrate is detected, it is very difficult to suddenly reverse the operation of the guide vanes and it can be easily inferred that the guide vanes are opened too much. Particularly, when you keep on operating the guide vanes even after the running point on the S characteristics ends moving along the flowrate decreasing direction and starts to move along the flowrate increasing direction, the influence by the S characteristics may be greater.

Judging from the above, it can be inferred that the method in accordance with Japanese Non-examined Patent Publication S53-143842 (1988) cannot assure the steady performance in case a plurality of pump turbines share an identical penstock or particularly when the flowrate of a pump turbine changes variously not only by its own running status but also by mutual hammering by other pump turbines.

SUMMARY OF THE INVENTION

An object of the present invention is to provide a stable pump turbine capable of suppressing water hammer phenomena and other transient influences from the S-characteristics at a load rejection which the conventional pump turbines cannot solve.

The present invention is characterized by a pump turbine which solves the above problem. The present invention is also characterized by controlling a governor to increase a target rotational speed of the runner after a load rejection which shuts off power generated by its generator, generator motor.

The present invention is also characterized by providing a governor designed to detect the rotational speed of the runner and control a discharge regulator such as guide vanes to get a predetermined rotational speed of the runner constantly and controlling the governor to make the target rotational speed only at the transient status immediately after a load rejection substantially higher than the target rotational speed at the steady status in case of the occurrence of a load rejection which shuts off power generated by a generator motor.

The present invention is also characterized by building up a system to increase and correct the preset rotational speed of the governor in the transient status immediately after a load rejection.

Further, the present invention is characterized by building up a system to increase and correct the preset rotational speed of the governor as the rotational speed increases immediately after a load rejection.

Further, the present invention is characterized by building up a system to increase and correct the target rotational speed as the rotational speed increases immediately after a load rejection, to gradually release (or decrease) the correction control after the rotational speed starts to go down, and to release the correction control substantially completely in the steady status.

Further, the present invention is characterized by building up a system to increase the preset rotational speed a little below and along the increasing speed curve while the rotational speed is increasing immediately after a load rejection.

The governor of the pump turbine in accordance with the present invention comprises a closing speed limiter which limits the closing speed of the discharge regulator according to the opening of the discharge regulator. If the closing speed limiter is designed to limit the closing speed of the discharge regulator to a second predetermined value or less which is comparatively higher while the opening of the discharge regulator is larger than a first predetermined value and to a third predetermined value or less which is comparatively lower after the opening of the discharge regulator is smaller than the first predetermined value, the correction control must not block the natural closing action of the discharge regulator by the governor until the opening of the discharge regulator is larger than the first predetermined value at least immediately after a load rejection.

After a load rejection, the present invention closes the discharge regulator when the opening of the discharge regulator is higher than the first predetermined value and temporarily opens the discharge regulator after the closing speed of the discharge regulator is once transferred below the third predetermined value in spite of a Closing command being given from the governor.

The present invention is also characterized by temporarily opening the discharge regulator by correction-control when the rotational speed stops increasing and starts decreasing after a load rejection. (The rotational speed value at this point is called a first peak value.)

In the present invention, the opening of the discharge regulator is made greater temporarily by the correction-control when the rotational speed starts to go down over this peak after a load rejection and consequently, the rotational speed stops decreasing and starts increasing at a much higher value than a natural target value in the steady status given by the governor. (The rotational speed value at this point is called a first bottom value.)

In other words, in the present invention, the opening of the discharge regulator is made greater temporarily by the correction-control when the rotational speed starts to go down over the first peak after a load rejection. This temporary opening operation continues to an inflection point at which the rotational speed curve turns from a convex curve to a concave curve. As the result, the rotational speed stops going down and starts going up at this much higher value than a natural target value in the steady status given by the governor. (The rotational speed value at this point is called a first bottom value.)

The present invention is characterized by starting the temporary opening operation of the discharge regulator by the correction-control before the rotational speed reaches the first peak value after a load rejection, continuing the operation to an inflection point at which the rotational speed curve turns from a convex curve to a concave curve after the first peak, and consequently stopping the decrease of the rotational speed and restarting the increase at the much higher value than a natural target value in the steady status given by the governor. (The rotational speed value at this point is called a first bottom value.)

The rotational speed increases again after the first peak value, stops increasing, and decreases again. (The rotational speed value at this point is called a second peak value.) The present invention is characterized by setting a correction-control releasing rate so that the second peak value may be lower than the first peak value.

The rotational speed decreases again after the second peak value, stops decreasing, and increases again. (The rotational speed value at this point is called a second bottom value.) The present invention is characterized by setting a correction-control releasing rate so that the second bottom value may be lower than the first bottom value.

The present invention is also characterized by correction-controlling the governor to substantially increase the target rotational speed according to the increase of the rotational speed immediately after a load rejection, and gradually releasing correction-control (or decreasing the rotational speed when the rotational speed starts to go down after the first peak, and releasing the correction control substantially completely in the steady status.

The governor of a pump turbine in accordance with the present invention comprises means for detecting a rotational speed, means for setting a target rotational speed, arithmetic means for entering a signal of a difference (which is called a Speed Difference signal) between a target speed signal from the target rotational speed setting means and an actual speed signal from the rotational speed detecting means and outputting an Opening command signal to the discharge regulator, and means for amplifying the signal coming from the arithmetic means and controlling the discharge regulator. The governor further comprises means (which is called a corrector) for entering a speed signal and outputting a signal to substantially correct the target speed command signal to the governor.

The present invention is characterized by comprising a first arithmetic unit which passes a rotational speed signal only when the rotational speed exceeds a fourth predetermined value, a second arithmetic unit which receives a signal output from the first arithmetic unit and outputs a signal (a target signal) which increases while the received signal is increasing in comparatively quick response to the received signal and decreases slowly when the received signal starts to decrease in comparatively slow response to the received signal, and a corrector which receives a signal (a target signal) from the second arithmetic unit and outputs the signal to the governor to substantially correct the target speed command signal.

The present invention is characterized in that the fourth predetermined values is well greater than the maximum rotational speed which can be obtained in the normal operation in an electric power system to which the generator motor is connected.

In the present invention, the second arithmetic unit makes a first order lag response of a comparatively short time constant while a signal output from the first arithmetic unit is increasing and/or a first order lag response of a comparatively long time constant while a signal output from the first arithmetic unit is decreasing.

In the present invention, the second arithmetic unit makes a first order lag response of a comparatively short time constant while a signal output from the first arithmetic unit is increasing and/or an attenuating response of a time constant which is longer than that of a signal before the signal starts to decrease while a signal output from the first arithmetic unit is decreasing.

In case the arithmetic means of the governor is of the PID arithmetic type (P for proportion, I for integration, and D for differentiation), the present invention is also characterized by adding correction signals prior to all P, I, and D operations.

Further, in case the arithmetic means of the governor is of the PID arithmetic type (P for proportion, I for integration, and D for differentiation), the present invention is characterized by adding correction signals to have effects only upon P and I operations.

Further, the present invention is characterized by adjusting a correction signal level so that the temporary opening of the discharge regulator may start in spite of a Closing command signal from the governor earlier than the increase of the rotational speed immediately after a load rejection stops.

Furthermore, the pump turbine of the present invention comprises a first governor which monitors the rotational speed of the runner in the Power Generation mode and controls the discharge regulator to settle the rotational speed of the runner to a predetermined value in any steady state and a second governor which controls the discharge regulator in place of the first governor upon a load rejection of the generator motor. The present invention is characterized by setting the target rotational speed of the second governor substantially higher than the target rotational speed of the first governor in the transient status at least just after a load rejection.

The present invention is characterized by suppressing a reverse water flow upon a load rejection which shuts off electric power generated by the generator motor.

The present invention is characterized in that the rotational speed of the runner does not go down so quickly as in the case of the conventional governor to a value preset by the governor in the transient status after a load rejection which shuts off electric power generated by the generator motor.

The present invention is characterized in that the rotational speed of the runner does not go down to a value preset by the governor upon a load rejection which shuts off electric power generated by the generator motor.

The present invention is characterized by suppressing a reverse water flow in the transient status after a load rejection which shuts off electric power generated by the generator motor.

The pump turbine of the present invention is characterized by suppressing a reverse water flow upon a load rejection which shuts off electric power generated by the generator motor.

The pump turbine of the present invention is characterized in that the rotational speed of the runner does not go down to a value preset by the governor in such a short time for the rotational speed to increase to the first peak value after a load rejection or similar.

Further the present invention is characterized by providing a correction controller which interrupts control by the governor upon the discharge regulator when the rotational speed starts to go down at the peak after the rotational speed quickly increases just after a load rejection in the Power Generation mode in order to temporarily cause the discharge regulator to open while the closing control by the governor is in progress and adjusting the correction control to temporarily increase the rotational speed so that the rotational speed may not go straight down from the peak value to a value predetermined by the governor or its vicinity at least upon full load rejection.

The present invention is also characterized by stopping correction control at the latest when the rotational speed starts to increase and returning control to the governor to adjust the discharge regulator.

The correction control to temporarily open the discharge regulator starts when the rotational speed after a load rejection starts to decrease and continues to a point (inflection point) where the rotational speed curve changes from a convex curve to a concave curve.

Next, the correction control to temporarily open the discharge regulator starts just before the rotational speed starts decreasing after a load rejection and continues to a point (inflection point) where the rotational speed curve changes from a convex curve to a concave curve in the rotational speed decreasing stage.

In the present invention, the correction-control is made to stop the first decrease of rotational speed after a full load rejection at a rotational speed point which is above one third of the difference between the rated rotational speed (or the natural target rotational speed of the governor) and the peak rotational speed value) and, instead, to increase the rotational speed from there.

Further in the present invention, the correction-control repeats the set of decreasing, stopping, and increasing of the rotational speed several times before the rotational speed after the full load rejection is brought down to a value preset by the governor (the natural target rotational speed of the governor).

The governor in accordance with the present invention comprises a closing speed limiter which limits the rate of closing the discharge regulator according to the opening of the discharge regulator. In case the closing speed limiter is designed to limit the closing speed of the discharge regulator to a second predetermined value or below which is comparatively high when the opening of the discharge regulator is a first predetermined value or above or to limit the closing speed of the discharge regulator to a third predetermined value or below which is comparatively low when the opening of the discharge regulator is a first predetermined value or below, the correction-control is disabled as long as the opening of the discharge regulator is above the first predetermined value.

After a load rejection, the rotational speed first decreases, turns at a point (a first bottom speed value) to increase by the correction-control, and then turns at another point (a second peak speed value) to decrease. The correction-control adjusts to make the second peak value lower than the first peak value.

Next, the rotational speed decreases after the second peak value, gradually stops decreasing, and turns at a point (a second bottom speed value) to increase. The correction-control adjusts to make the second bottom value lower than the first bottom value.

The governor of a pump turbine in accordance with the present invention comprises means for detecting a rotational speed, means for setting a target rotational speed, arithmetic means for entering at least a signal of a difference (which is called a Speed Difference signal) between a target speed command signal from the target rotational speed setting means and an actual speed signal from the rotational speed detecting means and outputting an opening command signal to the discharge regulator, and means for amplifying the signal coming from the arithmetic means and controlling the discharge regulator. The governor further comprises means (which is called a correction-controller) for entering at least a rotational speed signal, and means for correcting substantially the signal from the arithmetic means.

The correction-controller further comprises a first arithmetic unit which allows a rotational speed signal to pass only when the rotational speed exceeds a fourth predetermined value, a second arithmetic unit which receives a signal output from the first arithmetic unit and outputs a signal (a target signal) which increases quickly in comparatively quick response to the received signal while the received signal is increasing and decreases slowly in comparatively slow response to the received signal when the received signal starts to decrease, a comparator which compares the target signal and the signal output from the first arithmetic unit and outputs the result (a difference), a first limiting element which limits the positive component of the signal output from the comparator, a differential element which incompletely differentiates the signal output from the first limiting element, and a second limiting element which blocks the negative components of a signal output from the differential element and limits the positive components of the signal at a predetermined value.

In the present invention, the fourth predetermined value is well greater than the maximum rotational speed which can be obtained in the normal operation on an electric power system to which the generator motor is connected.

The present invention is also characterized by providing a second arithmetic unit which makes a first order lag response of a comparatively short time constant while a signal output from the first arithmetic unit is increasing or an attenuating response of a time constant which is longer than that of a signal before the signal starts to decrease while a signal output from the first arithmetic unit restarts to decrease.

The present invention is also characterized by providing a correction-control which is designed to determine the signal output timing according to actual transitions of the rotational speed and keep the output value constant between starting and resetting thereof.

Further, the correction-control of the present invention is designed to work only when the rotational speed is over a fifth predetermined value which is higher than a target value in the steady status and is disabled in the other status.

In case of emergency, to immediately stop the pump turbine running in the Power Generation mode, the pump turbine of the present invention fully closes the discharge regulator and stops the revolution of the pump turbine with both the governor and the correction-control operative at least initially in the emergency stop process.

Further, in case of emergency, to immediately stop the pump turbine running in the Power Generation mode, the pump turbine of the present invention first attenuates the unwanted influence of the S characteristics, fully closes the discharge regulator, and stops the revolution of the pump turbine with both the governor and the correction-control operative initially in the emergency stop process.

To solve the above problems, the present invention causes the discharge regulator to repeat the close and open operations several times to stop water flowing through the runner.

In the present invention, closing of the discharge regulator proceeds step by step as the closing and opening operations of the discharge regulator are repeated after a load rejection.

Further, the discharge regulator is made to temporarily open at least once before the decreasing rate of the rotational speed of the runner becomes a maximum after the first peak upon a load rejection. The governor is controlled to suppress a counterflow of water in the transition status after a load rejection.

Similarly, the discharge regulator is made to temporarily open at least once before the decreasing rate of the rotational speed of the runner becomes a maximum after the first peak upon a load rejection. The governor is controlled to make the rate of decrease of the rotational speed of the runner much smaller than the rate of increase thereof.

Further similarly, the discharge regulator is made to temporarily open at least once before the decreasing rate of the rotational speed of the runner becomes a maximum after the first peak upon a load rejection. The governor is controlled to eliminate a second water hammer peak in the upstream side of the turbine which is observed just after the rotational speed of the runner starts to decrease upon a load rejection according to the conventional governor.

A correction signal generator is also provided to supply correction values to the governor to make the rate of decrease of the rotational speed of the runner much smaller than the rate of increase of the rotational speed after a load rejection.

A correction signal generator is also provided to supply correction values to the governor to eliminate the second water hammer peak in the upstream side of the turbine which is observed immediately after the rotational speed of the runner starts to decrease after a load rejection.

A correction signal generator is also provided to supply correction values to the governor to eliminate the second water hammer peak in the upstream side of the turbine which is observed immediately after the rotational speed of the runner starts to decrease after a load rejection.

Further, the discharge regulator is made to temporarily open at least once before the decreasing rate of the rotational speed of the runner becomes a maximum after the first peak upon a load rejection. The governor is controlled to adjust the correction-control so that the maximum water pressure in the upstream pipe may be limited to be approximately constant around the first peak of the rotational speed.

A correction signal generator is also provided to supply correction values to the governor to correct the output signal of the governor. Upon a load rejection, the correction signal generator outputs a correction value to make the rate of decrease of the rotational speed of the runner much smaller than the rate of increase of the rotational speed.

A correction signal generator is also provided to supply correction values to the governor to correct the output signal of the governor. The correction signal generator corrects signals of the governor to eliminate the second water hammer peak in the upstream side of the turbine which is observed immediately after the rotational speed of the runner starts to decrease after a load rejection.

A correction signal generator is also provided to supply correction values to the governor to correct the output signal of the governor. The correction signal generator corrects the output signals of the governor to eliminate the second water hammer peak in the upstream side of the turbine which is observed immediately after the rotational speed of the runner starts to decrease after a load rejection.

DETAILED DESCRIPTION OF PREFERRED EMBODIMENTS

Below will be explained some preferred embodiments of the present invention with reference to accompanying drawings.

Figure 1:
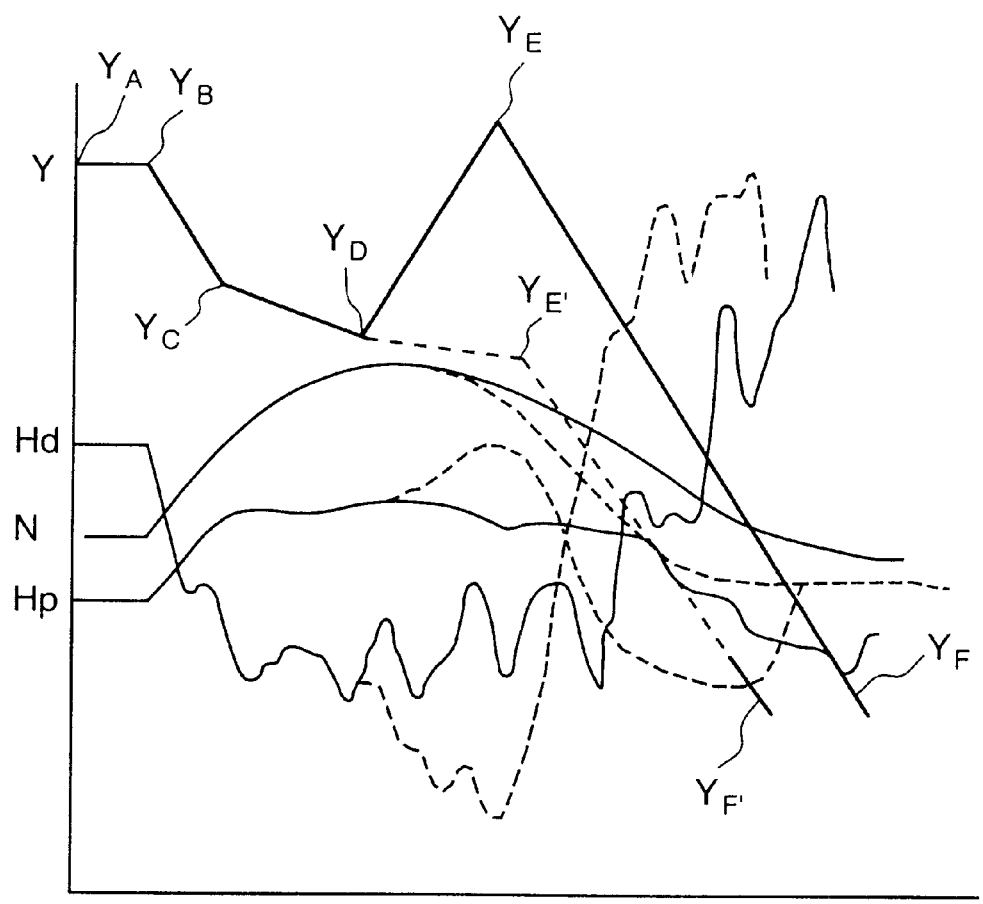
FIG. 1 shows a chart of conventional control.
Figure 2:
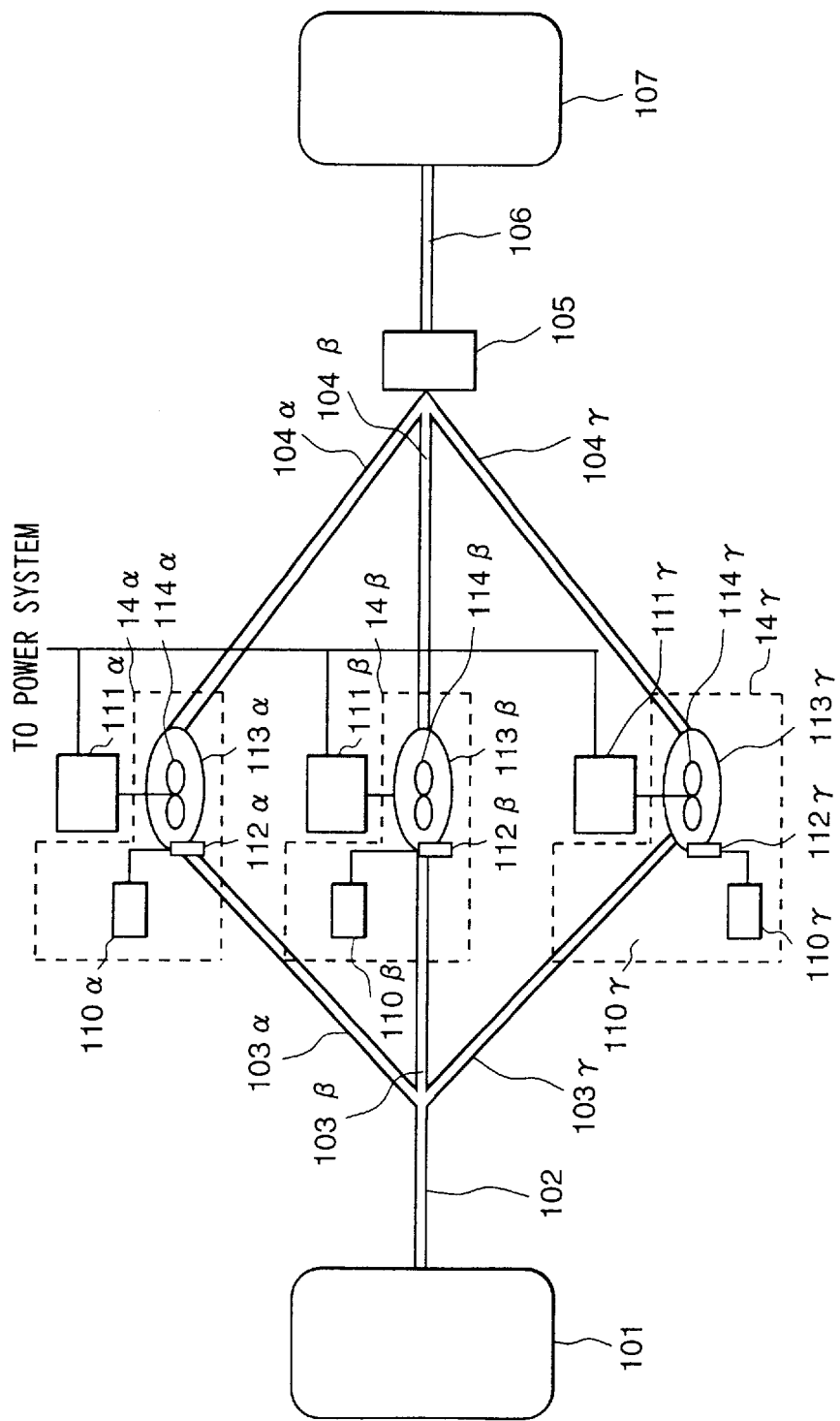
FIG. 2 is a diagram of a whole power plant with 3 pump turbines.

Referring to FIG. 2 will be explained the whole configuration of the pump turbine in accordance with the present invention. Water pooled in the upper reservoir 101 is guided into a penstock 102, then branched by penstocks 103α to 103γ respectively into pump turbines 14α to 14γ.

The quantities of water into runners 114α to 114γ of pump turbines 14α to 14γ from penstocks 103α to 103γ are controlled by guide valves 112α to 112γ which are respectively controlled by governors 110α to 110γ. The force of the running-down water rotates the runners 114α to 114γ and the power of the runners is transferred to power generators 111α to 111γ. Electric power generated by the generators 111α to 111γ is supplied to the power system.

Water passing through the pump turbines 14α to 14γ are guided by waterways 104α to 104γ into a surge tank 105 to dampen the shock. Then the water is guided into the lower reservoir 107 through a waterway 106. In case there is much surplus electric power left unused for example at night, the pump turbines 14α to 14γ are rotated reversely to pump up water from the lower reservoir to the upper reservoir. With this, the system is now ready for next power generation in preparation for urgent power requirements.

Figure 15:
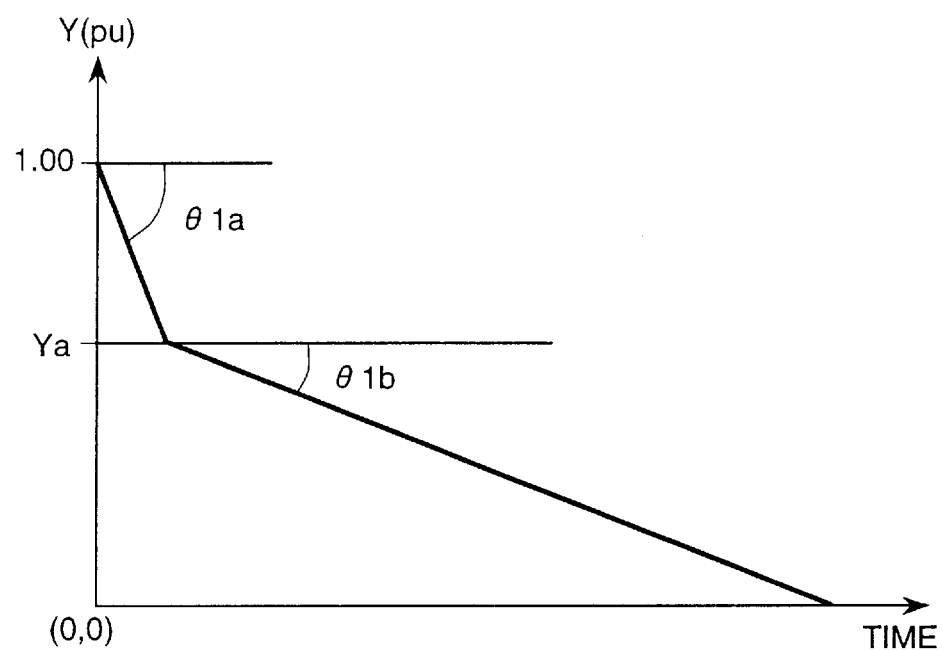
FIG. 15 is a graph explaining the limitation of the closing rate of the guide vanes.

An example of using three such pump turbines in parallel will be explained below. The upstream side, downstream side, or both sides of the pump turbines having the S characteristics are coupled as shown in FIG. 15.

S-characteristics

Below will be explained S-characteristics specific to such equipment.

In general, the discharge characteristics of a pump turbine are expressed by a group of characteristic curves indicating relationships between the number of revolutions per unit head ($N1=N/\sqrt{H}$) and the discharge per unit head ($Q1=N/\sqrt{H}$) using the opening of the guide vane as a parameter. On the other hand, the torque characteristics of the pump turbine are expressed by a group of characteristic curves indicating the relationship between the number of revolutions per unit head ($N1=N/\sqrt{H}$) and the torque per unit head ($T1=T/H$) using the opening of the guide vane as a parameter. These two kinds of characteristic curves are generically termed perfect characteristics.

The discharge characteristic curve, in the turbine operation domain, has a first region where the Q1 value decreases as the N1 value increases and a second region where the Q1 value decreases as the N1 value decreases. For easier comprehension, the second region is referred to as an S-characteristics region in this specification.

Further, the pump turbine characteristics in the S-characteristics region is hereinafter termed as S-characteristics. For a turbine operation in the S-characteristics region, the torque per unit head (T1) also decreases as the number of revolutions per unit head (N1) decreases.

The normal pump turbine operation in the turbine mode is performed in the first region. However, when the number of revolutions per unit head (N1) suddenly increases upon a load rejection, the pump turbine operation is in the S-characteristics region.

When the pump turbine operation starts at a point in the S-characteristics region, the running point of the pump turbine moves along the curve in the S-characteristics region from one end to another end. Initially, the discharge per unit head (Q1) and the number of revolutions per unit head (N1) decrease. Then the running point of the pump turbine swings back (like a pendulum) along the curve in the S-characteristics region. Naturally, both the discharge per unit head (Q1) and the number of revolutions per unit head (N1) increase. This reciprocating motion in the S-characteristics region infinitely continues unless the guide vanes are closed. At the same time, the torque per unit head (T1) also swings between decreasing and increasing. This swinging phenomenon is striking in the region where the Q1 value (or T1 value) increases as the N1 value increases. However, pump turbines whose characteristics Q1 to N1 is upright also show this phenomenon. This is because the speed control system by the governor becomes less stable as the gradient $\delta Q1/\delta N1$ or $\delta T1/\delta N1$ becomes great (steep). The S-characteristics contains not only a region where the Q1 value (or T1 value) increases as the N1 value increases but also a region where the gradient $\delta Q1/\delta N1$ (or $\delta T1/\delta N1$) is great (steep) even when the gradient $\delta Q1/\delta N1$ (or $\delta T1/\delta N1$) is less than 0. Therefore, it is needless to say that the present invention is also applicable to pump turbines having such steep gradients.

Figure 3:
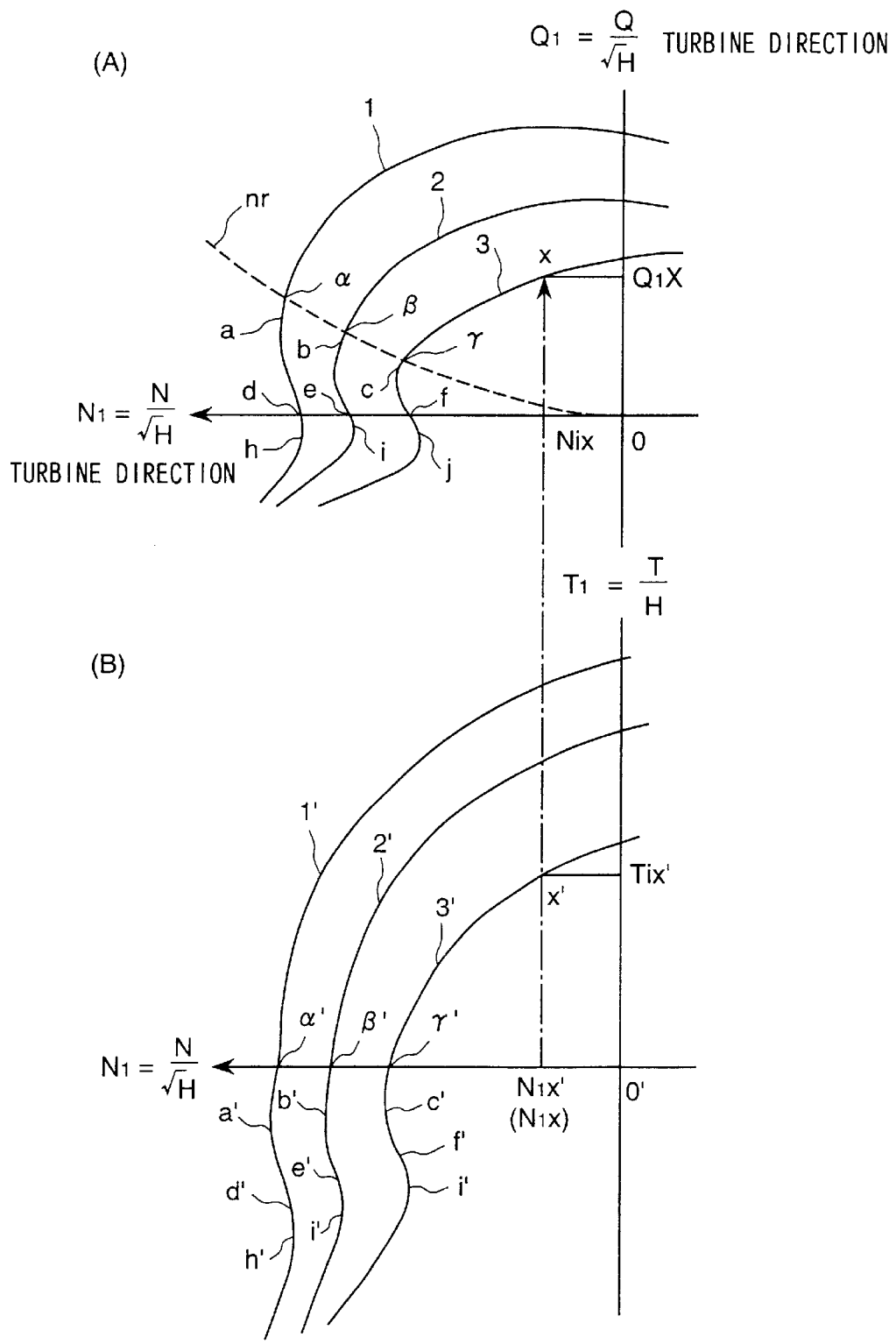
FIG. 3 shows two graphs explaining the S characteristics.

The characteristics of a pump turbine having S-characteristics in the turbine operation region are shown in FIG. 3(A) and FIG. 3(B). The pump turbine characteristics of FIG. 3(A) shows a relationship between the number of revolutions per unit head (N1) and the discharge per unit head (Q1) using a guide vane opening as a parameter. Similarly, the pump turbine characteristics of FIG. 3(B) shows a relationship between the number of revolutions per unit head (N1) and the torque per unit head (T1) using a guide vane opening as a parameter.

In the above description, symbols N, Q, H, and T respectively indicate the number of revolutions, discharge, effective head, and torque of the pump turbine.

The characteristic curves 1 and 1' are obtained when the opening of the guide vanes are comparatively great and predetermined. The characteristic curves 2 and 2' are obtained when the opening of the guide vanes are smaller.

The characteristic curves 3 and 3' are obtained when the opening of the guide vanes are much smaller.

In the line segment a-d-h of the characteristic curve 1, the Q1 value decreases as the N1 value decreases. This line segment is called the S-characteristics region in this specification. Similarly, the line segment b-e-i is called the S-characteristics region of the characteristic curve 2 and the line segment c-f-j is called the S-characteristics region of the characteristic curve 3. As seen at a glance, the segment a-d-h of the characteristic curve 1 is longer than the line segment b-e-i and the line segment b-e-i is longer than the line segment c-f-j. This means that the line segment of the S-characteristics becomes shorter as the opening of the guide vanes becomes smaller.

In FIG. 3(B) as well as FIG. 3(A), line segments a'-d' d'-h', b'-e'-i', and c'-f'-j' are S-characteristics regions of the characteristic curves 1', 2', and 3'.'

FIG. 3(B) is closely related to FIG. 3(A). For example, point x on curve 3 in FIG. 3(A) which satisfies Q1=Q1x and N1=N1x corresponds to point x' on curve 3' in FIG. 3(B). Point x' satisfies T1=T1x' and N1=N1x' (=N1x). Similarly, points a, b, c, d, e, f, h, i, and j in FIG. 3(A) correspond to points a', b', c', d', e', f', h', i, and j' in FIG. 3(B) respectively.

Curve nr is a no-load discharge curve. Intersections α, β, and γ of the curve nr and the curves 1, 2, and 3 correspond to intersections α', β', and β' of the straight line T1=0 and the curves 1', 2', and 3'.

Figure 4:
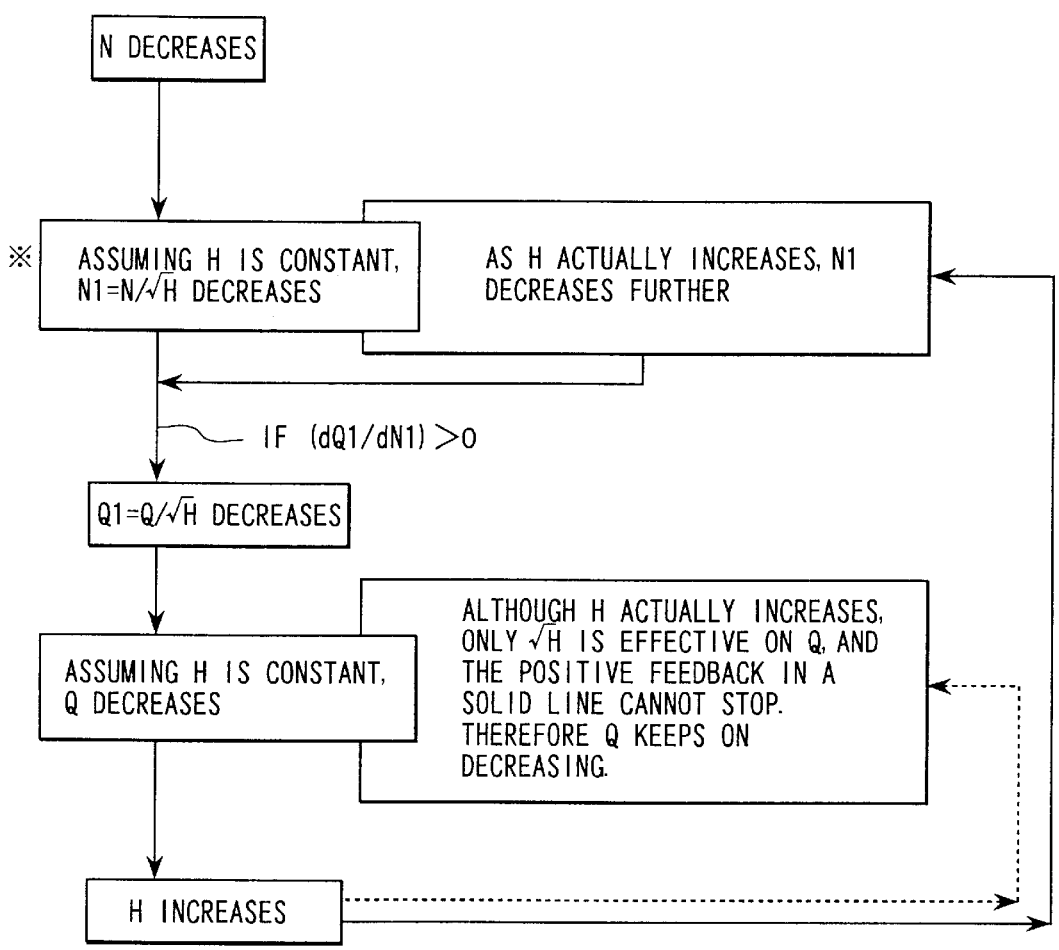
FIG. 4 is a flow chart of the positive feedback action caused by the S-characteristics.

The turbine operation (for power generation) of a pump turbine will be explained below referring to the characteristic curves 1 and 1'. As mentioned above, the characteristics corresponding the characteristic curve 1 to the characteristic curve 1' are obtained when the opening of the guide vanes is comparatively great. Usually, the turbine operation of a pump turbine is conducted above the characteristic curve 1, that is, on a curve above the line segment a-d-h of the S characteristic region. However, for example, when a load upon the pump turbine is suddenly lost, the number of revolutions (N) of the pump turbine increases drastically, the N1 value also increases drastically. The pump turbine starts running in the S-characteristics region. When the running point enters the S-characteristics region, the number of revolutions (N) of the pump turbine decreases and the N1 value and the Q1 value decrease. Consequently, the pump discharge (Q) decreases. FIG. 4 explains this in detail. Contrarily, the head (the H value) between the entrance and the exit of the pump turbine increases as the discharge Q decreases. Once the N1 value decreases, the discharge Q decreases. The decrease of the discharge Q causes the increase of the effective head H of the pump turbine. Further the increase of the effective head H causes the decrease of N1 and the decrease of N1 causes the decrease of Q1. In this way, once the pump turbine starts running in the S-characteristics region, Q1 and N1 decrease with increasing speed from point a to point d (to reduce the Q1 value in the S-characteristics region). It is needless to say that the progress of decrease of Q is suppressed by attenuating forces such as penstock frictions and the like. Anyway, Q1 and N1 are apt to decrease with increasing speed as well as they are in a positive feedback circuit.

Figure 5:
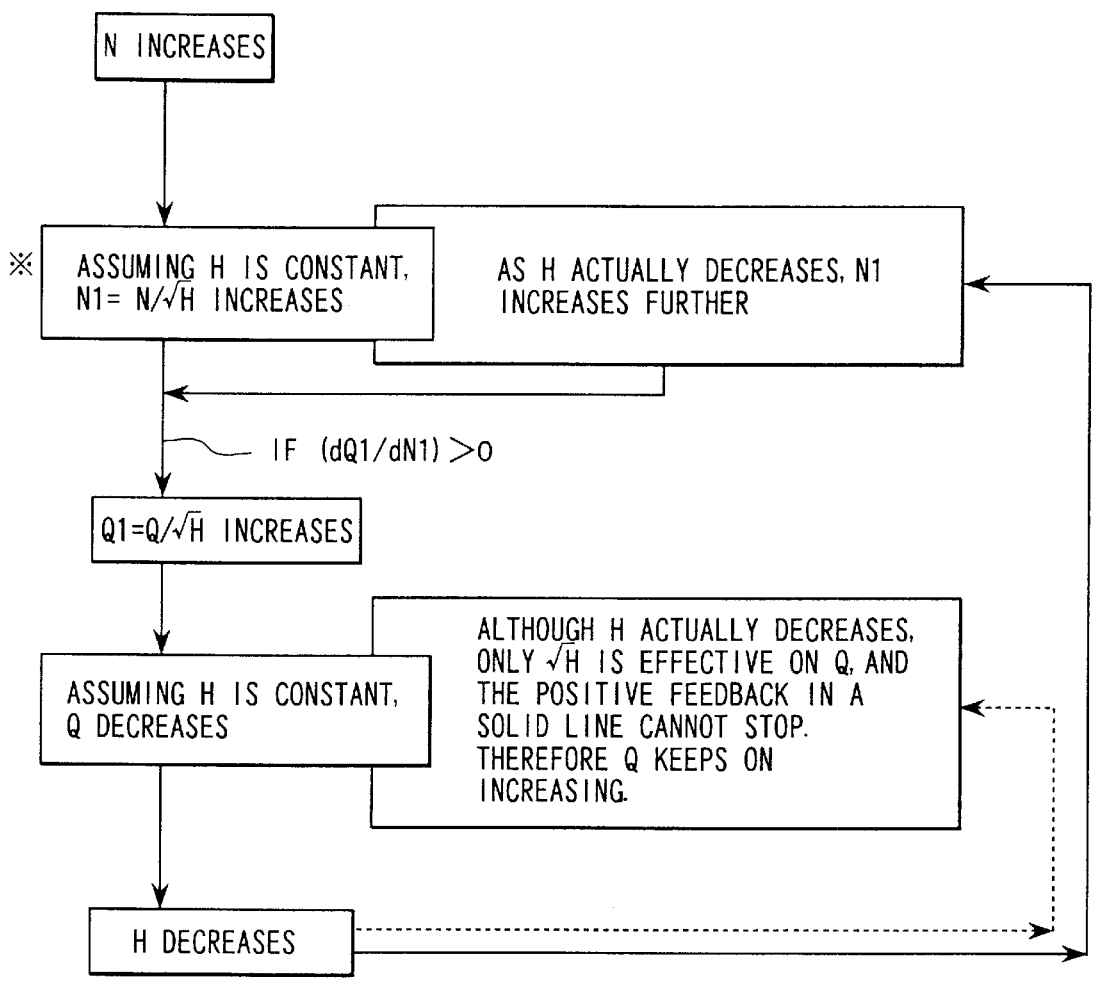
FIG. 5 is a flow chart of the positive feedback action caused by the S-characteristics.

When the running point of the pump turbine reaches point h (from point a) in the S-characteristics region, the above phenomenon is gradually eased as well as in a negative feedback circuit. The running point starts to move up (to increase Q1) from a little after point h to point a in the S-characteristics region. This reverse movement of the running point is conducted in the same manner as in the positive feedback circuit. FIG. 5 explains this swing-back.

As stated above, when the guide vanes of the pump turbine are left unclosed after load rejection, the running point of the pump turbine swings on the S-characteristics curve corresponding to the guide vanes. Therefore, the operation depending upon the pump turbine characteristics is detrimental and dangerous in some particular cases. Because the discharge of the pump turbine increases and decreases repeatedly and violent water hammers repeatedly generate in the penstocks of the hydroelectric power station.

Such an unwanted influence made during operation in the S-characteristics region decreases when the S-characteristics region becomes shorter. For example, in case the pump turbine is run along the characteristics curve 2 containing a line segment b-e-i which is made shorter with the opening of the guide vanes smaller, such an influence can be reduced.

The pump turbine operation in the S-characteristics region adversely affects also the torque T of the pump turbine. When the value of N1 decreases in the S-characteristics region, as shown in FIG. 3(B), the T1 value decreases. Here, note that the points a and h on the characteristic curve 1 shown FIG. 3(A) respectively correspond to points a' and h' on the characteristic curve 1' in shown FIG. 3(B).

Assuming that the effective head H is constant, the decrease of Ti means the decrease of the torque T of the pump turbine. Further, it is obvious that the decrease of the torque T of the pump turbine causes a decrease in the number of revolutions N of the pump turbine. As the number of revolutions N of the pump turbine decreases, N1 and Ti decrease in sequence. In actual operations, this decrease progresses with increasing speed as the effective head increases as mentioned above. Therefore, the running point of the pump turbine moves along the characteristics curve 1'from point a' to point h' while moving along the characteristic curve 1 toward smaller Q1. This movement is the same as that in the positive feedback circuit. When the movement is reversed in the S-characteristics region, the running point moves back from point h' to point a' on the characteristic curve 1. Apparently from the above, the torque fluctuation is not acceptable.

It is dangerous to quickly close the guide vanes when the running point of the pump turbine moving down along the S-characteristics curve after load rejection. This is because an action encouraging the decrease of N1 exerts.

Mutual hammer interference

Figure 6:
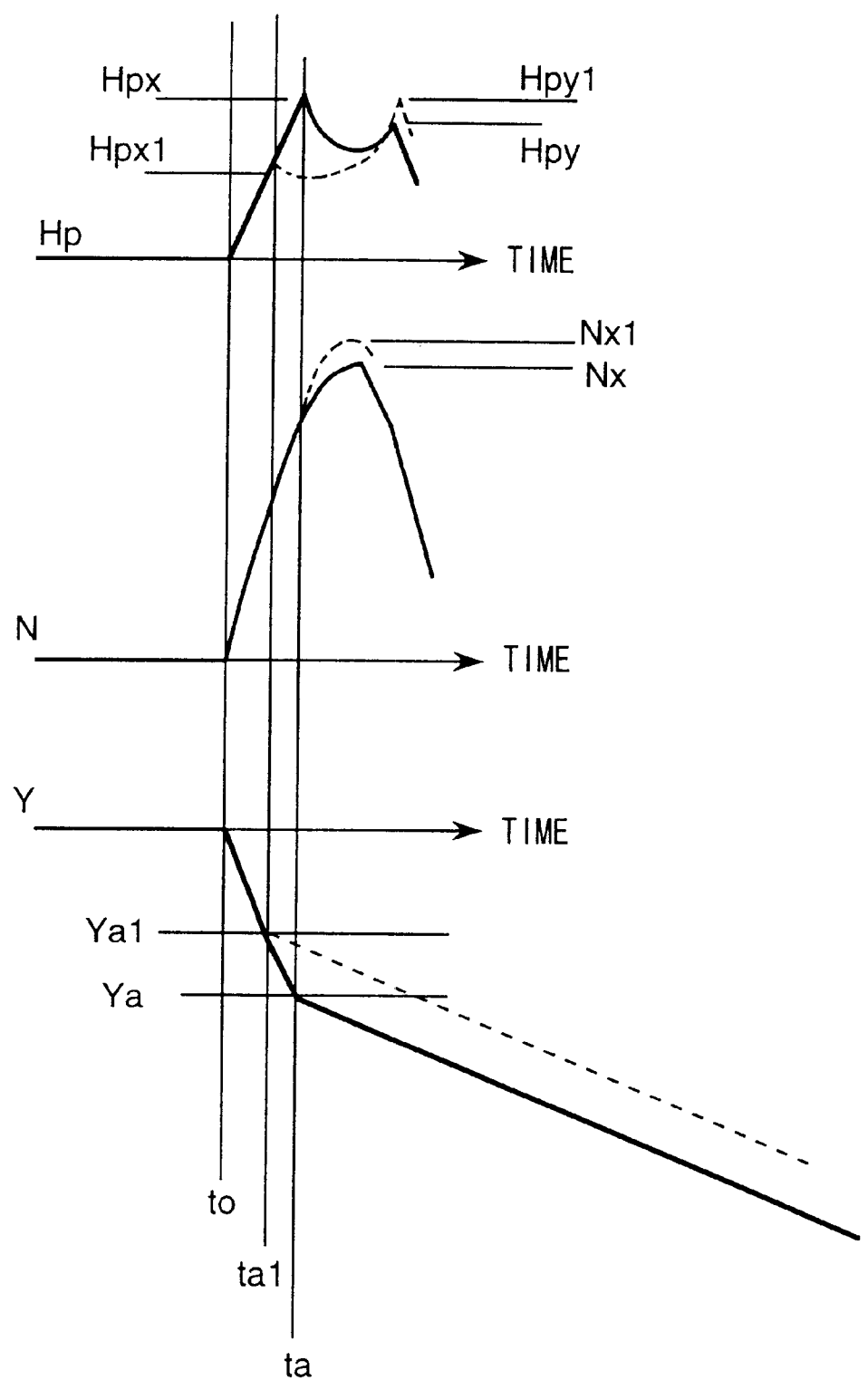
FIG. 6 is a graph explaining the relationship between a closing pattern of guide vanes and water hammering.

In the turbine mode, the influence of the S-characteristics can be suppressed by setting the upper vane closing rate when the opening of the guide vanes is less than for example 80% or by setting a value lower than the upper vane closing rate when the opening of the guide vanes is 80% or more. Upon a load rejection, immediately before the running point enters the S-characteristics region, the vane closing rate changes from "fast" to "slow." A bending is made here in the closing pattern. Referring to FIG. 6, let's assume that, for example, a load rejection is made (at time t0) when the opening of the guide vanes is almost 100%. Initially, the guide vanes close comparatively fast. When the opening of the guide vanes reaches a preset opening value Ya, a smaller closing rate limit is selected.

Therefore, when the running point enters the S-characteristics region in which the pump turbine speed starts to decrease over a maximum value and is moving toward a smaller discharge, the vane closing rate is limited to a comparatively slow rate. This suppresses acceleration of an excessive positive feedback phenomenon due to the above-stated N1 decrease and consequently, an excessive water hammering peak can be prevented.

FIG. 6 shows a relationship between the vane closing pattern and water hammering peak particularly the rise of a penstock pressure Hp in the upper reservoir side upon a load rejection depending upon switching of the vane closing rate according to the guide vane closing. In other words, when you increase the opening Ya of the guide vanes at which the vane closing rate is switched from "fast" to "slow," the first peak penstock water pressure Hpx in the upper reservoir side goes down to Hpx1, but the second peak penstock water pressure Hpy goes up to Hpy1. The waveform of the penstock water pressure Hd in the lower reservoir side is just like an upside-down image of the waveform Hp (although it is not visible in FIG. 6) and the decrement Hdy1 of the second peak is lower than Hdy. In other words, when the gradient is limited to a smaller value, the first peak value Hpx goes down and the second peak value Hpy goes up. The most typical example is a case the fast closing rate becomes equal to the slow closing rate under the bending point.

Therefore, depending only on the bending in the guide vane closing pattern, the vane closing pattern has been determined so that the peak value Hpx of the penstock water pressure in the upper reservoir side which appears during fast vane closing immediately after a load rejection may be approximately equal to the peak penstock water pressure value Hpy in the upper reservoir side which appears by the S-characteristics after the speed starts to decrease. Substantially, this is done by adjusting the bending opening Ya, the fast vane closing speed limit when Y>Ya, and the slow vane closing speed limit when Y<Ya.

Figure 7:
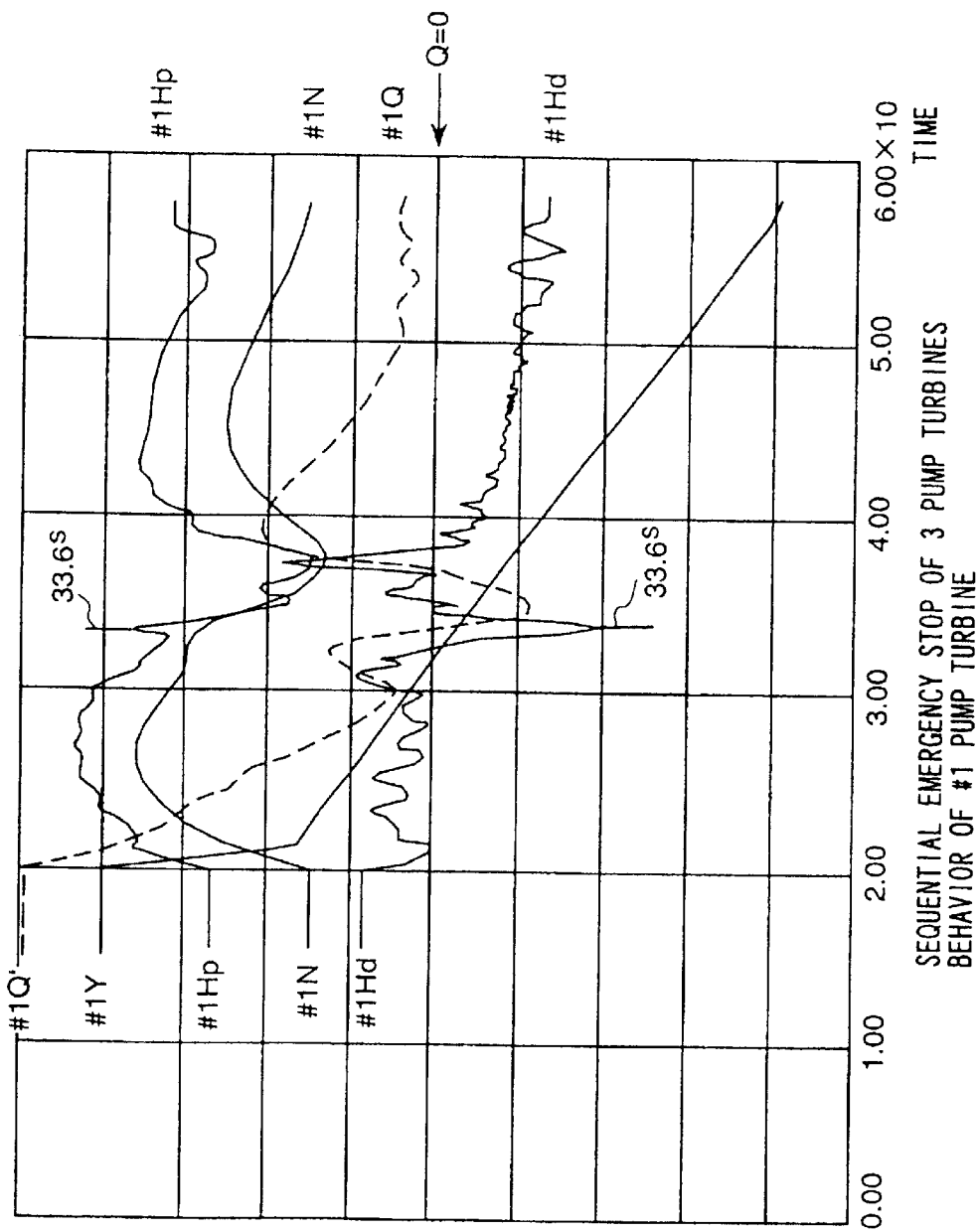
FIG. 7 is a graph explaining the mutual hammer interference.
Figure 8:
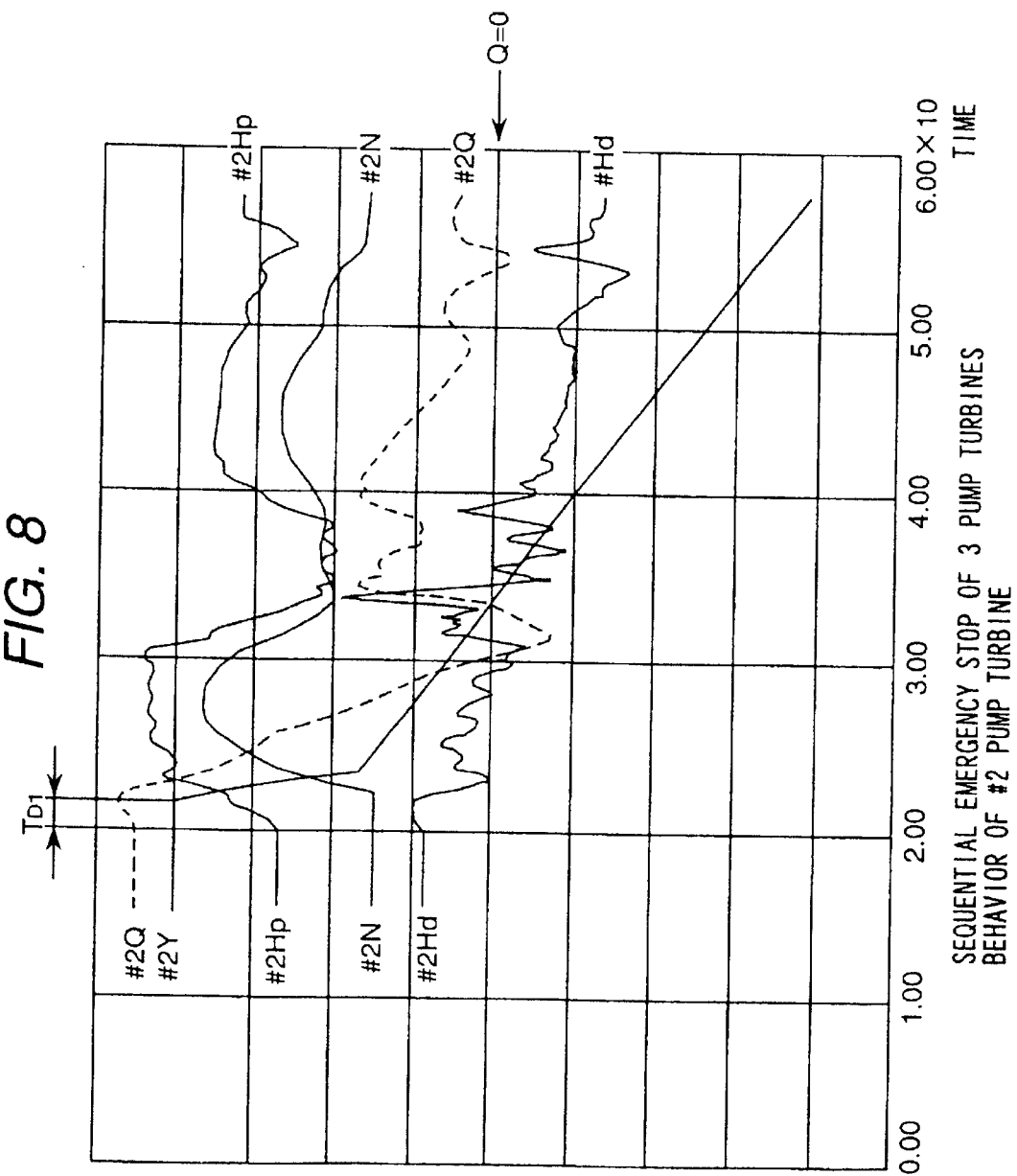
FIG. 8 is a graph explaining the mutual hammer interference.
Figure 9:
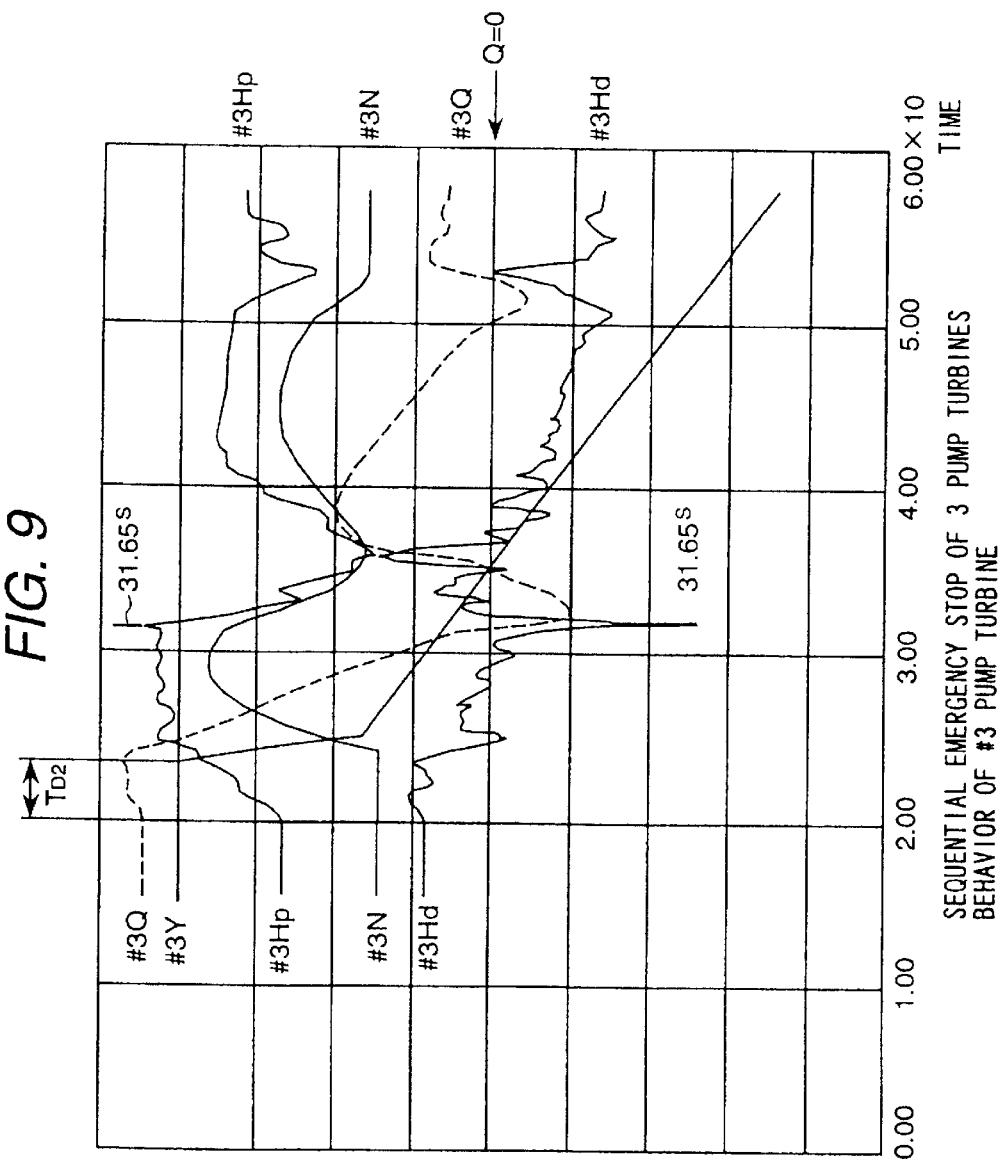
FIG. 9 is a graph explaining the mutual hammer interference.

The inventors of the present invention recognized that depending only on the bending of the vane closing pattern is not enough. For example, in case a plurality of pump turbines having S-characteristics are coupled in the upstream side, in the downstream side, or in both sides as shown in FIG. 2, it has been well-known that the mutual hammer interference will cause abnormal rise in the upstream water pressure or abnormal fall in the downstream water pressure. Assuming that the pump turbines have the same specifications, there have been various problems. One of the problems is that the maximum upstream water pressure upon sequential load rejections (which reject the loads of the pump turbines one after another) is higher than the maximum upstream water pressure upon a spontaneous load rejection. Another problem is that the minimum downstream water pressure upon sequential load rejections (which reject the loads of the pump turbines one after another) is lower than the minimum downstream water pressure upon a spontaneous load rejection and that separated water columns generate in extreme cases. What is worse, conditions such as time differences to make the case worst are hard to be known in advance as these abnormal hammering phenomena are closely related fine timing of tracing along the S-characteristics. FIG. 7, FIG. 8 and FIG. 9 are graphs explaining why such conditions are hard to be recognized in advance upon the sequential load rejections. These figures assume that three pump turbines are coupled together to one upstream penstock and to one downstream penstock. In this example, the pump turbine #1 is full-load rejected at a time point of 20 second. Td1 seconds later after the full-load rejection, the pump turbine #2 is full-load rejected. Td2 seconds later after the first full-load rejection, the pump turbine #3 is full-load rejected. As the result, the downstream water pressure of the pump turbine #1 drops rapidly at a time point of 33.6 seconds, or 13.6 seconds after a load rejection.

This kind of mutual hammer interference causes sudden spike-like downstream water pressure drops to generate. Nevertheless, to suppress water-column separation in the downstream penstocks of the pump turbines, the pump turbines must be installed as low as possible and assure a sufficient water level difference above the lower reservoir. This greatly increases the quantity of soil to be dug for installation of pump turbines and the construction cost.

Figure 10:
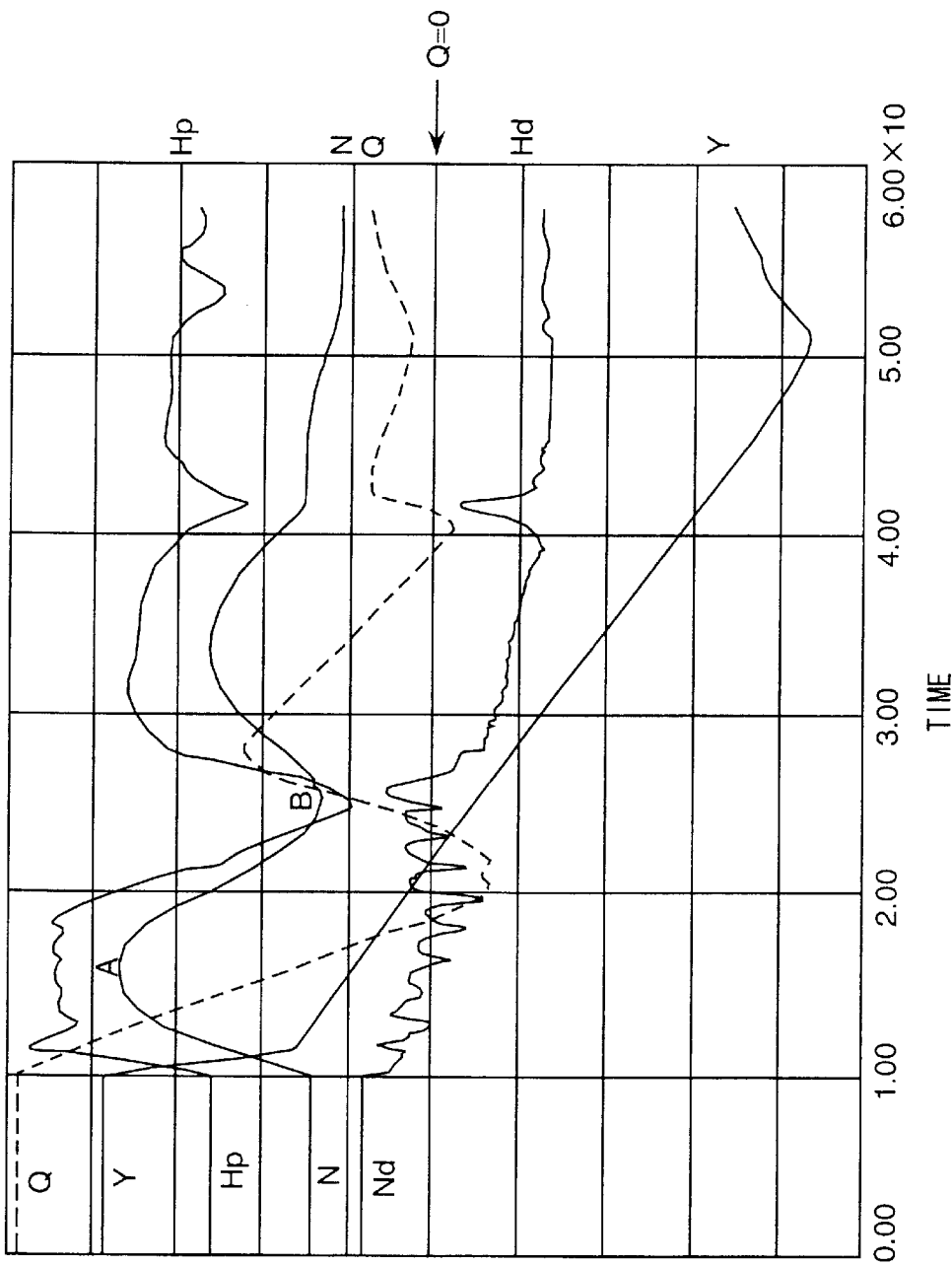
FIG. 10 is a typical graph explaining transient phenomena of the pump turbine upon load rejection according to the conventional control.

In this case, it is not so striking that abnormal water hammerings due to mutual interference appear in the upstream side because the vane closing pattern is set to make the upstream penstock water pressure peak Hpx during vane closing higher than the upstream penstock water pressure peak Hpy which appears by the S-characteristics after the rotational speed starts to decrease when each pump turbine is full-load rejected (see FIG. 10). In other words, this case assumes that Hpx is set fully higher than Hpy and the designed upstream water pressure is made fully high, sacrificing the upstream construction cost. Of course, Hpx must be smaller to reduce the upstream construction cost. For this purpose, the mutual hammer interference in the upstream penstocks must be eliminated. Even when the abnormal pressure rise due to mutual hammer interference in the upstream penstock is eliminated by the use of a vane closing pattern in FIG. 10, spikes due to mutual interference in the downstream penstocks still remain. (See FIG. 7, FIG. 8, and FIG. 9.)

Influence by the S-Characteristics and Concept of Water Hammer Suppression.

Below will be explained the concept of control for easier comprehension before the control circuit is explained in detail.

Part of some items may be omitted in the control circuit although they are explained here. However, they are assembled in software of the control circuit and the user can select to use.

Figure 11:
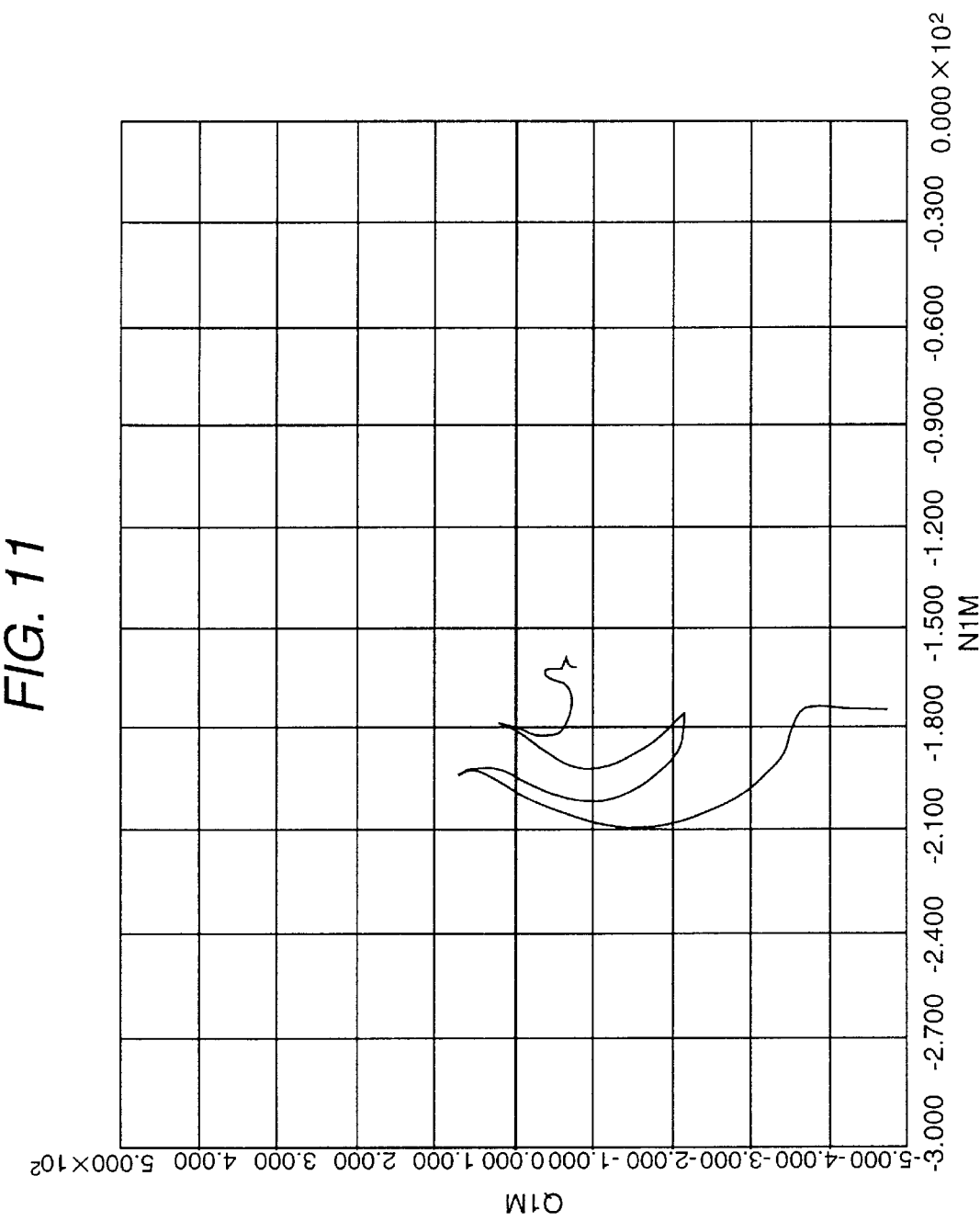
FIG. 11 is a graph explaining a unit-discharge versus unit-speed trajectory of the pump turbine upon load rejection according to the conventional control.

Immediately when a load on a pump turbine is rejected, the power generation output becomes a zero but there is a time delay before the turbine output becomes a zero, during which the revolution increases. Necessarily, the surplus energy caused by this output difference is temporarily stored in the rotor by the inertial effect, which the present invention intends. The straight reduction of the rotational speed to a rated rotational speed or the vicinity just after starting to decrease means an immediate discharge of the stored energy. This sudden discharge of inertia energy from the rotor is a kind of problem, because there is something to receive this sudden discharge of energy from the rotor. It is a long water column in the up- and down-stream sides of the pump turbine. The sudden energy discharge will extremely decelerate the water column and further cause a pump-running flow. The target water discharge after a load rejection is a no-load discharge. Ideally, a smooth movement from an output-equivalent discharge before a load rejection to a no-load discharge is expected. However, the actual discharge is temporarily made straight to the pump area. Naturally enough, such an abnormal acceleration of a water column causes a reaction. Namely, the energy discharge causes an excessive turbine-running flow far above the non-load discharge from the pump-running flow. This time, the rotor receives the water column energy by the inertia effect and the rotational speed increases again. In this way, this excessive surplus energy swings between the inertia effect of the rotor and the water column and causes the pump turbine discharge to swing excessively. This produces an extreme water hammering peak in the up- and down-stream penstocks of the pump turbine. FIG. 11 shows an example of movement of the running point of the pump turbine upon a load rejection as well as in FIG. 10. The first sudden decrease of rotational speed after a load rejection from which the problem has arisen is required by the governor which controls the rotational speed. For the governor, this is a natural request. In other words, for a pump turbine having the S-characteristics, it is not rational, judging from discharge control and hammering control, to control only upon requests from the governor upon a load rejection. Thus, the most important thing is to apply a correction-control to temporarily make the target rotational speed recognized by the governor substantially greater than the target value in the steady status and to make the first speed decrease after the load rejection go straight down to the rated rotational speed or the vicinity.

Substantially, when the speed setting of the governor is temporarily increased for correction immediately after a load rejection, the governor assumes that the expected rotational speed is obtained before the speed reduction is enough and starts to open the closed guide vanes.

It is too late when the speed setting of the governor is increased for correction in haste just after the rotational speed increases after a load rejection and then starts to decrease. Therefore, it is recommended to increase the speed setting of the governor according to the increase of the rotational speed while the rotational speed increases immediately after a load rejection. The speed setting can be increased smoothly as the rotational speed increases smoothly.

The above target speed correction must be canceled as soon as possible after it is made. Otherwise the speed decrease be slowed after a load rejection. Therefore, it is necessary to gradually cancel (decrease) the correction control after the speed starts to decrease and cancel it substantially completely in the steady status.

In the first speed increase immediately after a load rejection which is before the running point rushes into the S-characteristics region, the guide vanes should be closed as fast as possible as far as up- and down-stream hammering permits. This is to make the S-characteristics to be followed as small as possible before the running point rushes into the S-characteristics region. Therefore, at this view point, it is necessary to suppress increasing the speed setting during the first speed increase after a load rejection as long as it does not block the first vane closing. In other words, it is recommended to make the running point follow below and along the speed-increasing curve with a preset distance between them.

In other words, it is to adjust the correction-control so that the closing operation of the discharge controller requested by the governor may not be blocked before the opening of the discharge controller or the guide vanes falls below the first predetermined value after a load rejection.

Further in detail, a correction-control should be made to temporarily open the discharge control independently of a Continue Closing command signal from the governor after the opening of the discharge controller falls below the first predetermined value after a load rejection and the closing rate of the discharge controller goes below the third predetermined value.

After the first speed rise upon the load rejection stops at a point (which is called a first speed peak) and the running point starts to go down along the S-characteristics curve towards a smaller discharge, the correction-control should be adjusted to temporarily open the discharge controller. This can eliminate vibration of the S-characteristics.

As the result, in the first speed decrease, the rotational speed stops decreasing at a point much higher than the natural target speed value given by the governor in the steady status (which is called a first bottom value) and starts to increase. As the result, the first speed reduction limits the energy which is received by the water column in the up- and down-stream penstocks of the pump turbine.

The time period in which the running point of the pump turbine is moving along the S-characteristics curve towards a smaller discharge is equivalent to an inflection point or vicinity at which the speed curve changes from "Decrease" (a peak) to "Increase" (a bottom) although it depends upon the characteristics of pump turbines. Accordingly, the temporary opening of the discharge controller by the correction-control should be continued at latest starting from a time point at which the rotational speed after the load rejection starts to decrease over the first peak to a time point at which the speed curve changes from "peak" to "bottom."

More effectively, the correction-control should be started a little before the rotational speed reaches the first peak. (This has no time delay.) In other words, it is effective to start the temporary opening of the discharge controller by the correction-control a little before the speed reaches the first peak and continue it to an inflection point at which the speed decreasing curve changes from "peak" to "bottom." Consequently, the rotational speed stops decreasing at a point much higher than the natural target speed value given by the governor in the steady status (which is called a first bottom value) and starts to increase. Also in this case, the first speed peak remains almost unchanged. For pump turbines having the S-characteristics, this first speed peak is dependent upon the starting point (N1) of the S-characteristics of the pump turbine at the current opening of the discharge controller or the guide vanes. The N1 change is hardly affected by the opening of the guide vanes.

Of course, the correction-control is made when necessary, but the correction-control is canceled as quickly as possible after it is used. Otherwise, the rotational speed after a load rejection will never return to a predetermined value which the governor requests. In this sense, the rotational speed starts to increase again passing by the first bottom, stops increasing, and starts to decrease again at a point (which is called a second peak). The rate of canceling the correction-control is set to make the second peak lower than the first peak.

After the second peak, the rotational speed starts to decrease again, stops decreasing, and starts to increase again at a point (which is called a second bottom). Similarly, the rate of canceling the correction-control is set to make the second bottom lower than the first bottom.

In the same sense, the governor is correction-controlled to make the target speed substantially increase as the rotational speed increases after the load rejection. The correction-control is gradually canceled (decreased) after the speed starts to decrease again and canceled substantially completely in the steady status.

To a conventional pump turbine having a governor comprising means which detects a rotational speed, means which sets a target rotational speed, arithmetic means which enters a signal of a difference (which is called a Speed Difference signal) between a target speed command signal from the rotational speed detecting means and an actual speed signal from the rotational speed detecting means and outputs an opening command signal to the discharge regulator, and means which amplifies the signal coming from the arithmetic means and controls the discharge controller (discharge regulator), the present invention can be applied when the governor further comprises means (a corrector) which enters a speed signal and outputs a signal for substantially correcting said target speed command signal to the governor.

Below will be explained an embodiment of said correction controller. The proposed correction controller comprises a first arithmetic unit which passes a rotational speed signal only when the rotational speed goes over a fourth predetermined value and a second arithmetic unit which receives a signal output from said first arithmetic unit and outputs a signal (a target signal) which increases while the received signal is increasing in comparatively quick response to the received signal and decreases slowly when the received signal starts to decrease in comparatively slow response to the received signal and supplies the output of said second arithmetic unit or said target signal to said governor to substantially correct said target speed command signal.

Said correction controller should be kept inoperative during normal operation of the pump turbine while the generator motor is connected to an electric power system. Accordingly, said fourth predetermined value must be set much higher than the maximum speed that may occur in the normal operation (while the generator motor is connected to the electric power system).

A preferred embodiment of said second arithmetic unit makes a first order lag response of a comparatively short time constant while a signal output from said first arithmetic unit is increasing or a first order lag response of a comparatively long time constant while a signal output from the first arithmetic unit is decreasing.

Another preferred embodiment of said second arithmetic unit makes a first order lag response of a comparatively short time constant while a signal output from said first arithmetic unit is increasing or an attenuating response of a comparatively long time constant which attenuates along an attenuating curve with the output before the decrease as a starting point once the speed starts to decrease.

Below will be explained some concrete methods of applying said correction-control signal to said governor. One of the methods is to apply said correction signals prior to all P, I, and D operations (P for proportion, I for integration, and D for differentiation) in case the arithmetic means of the governor are of the PID arithmetic type.

Another method is to apply said correction signals to the governor to have effects only upon P and I operations in case the arithmetic means of the governor are of the PID arithmetic type (P for proportion, I for integration, and D for differentiation).

Further the delay of the correction-control can be eliminated by making a time point at which said correction controller starts to temporarily open said discharge controller (independently of a Continue Closing command signal from said governor) a little earlier than a time point at which the rotational speed immediately after a load rejection stops increasing.

The same effect of the present invention can be obtained also by providing a second governor which is constituted to control said discharge controller in place of said first governor after a load rejection which shuts off power generated by said generator motor and by making the target speed of said governor substantially higher than the target speed of said first governor in the transient status immediately after a load rejection.

While the speed after a load rejection is decreasing, a correction-control should be applied to a command signal output from the governor to temporarily open the closed guide vanes and ease or block the N1 decrease due to the S-characteristics. Consequently, this suppresses excessive discharge reductions or overshootings.

The correction-control on the governor output to open the guide vanes should be stopped when the rotational speed reversely starts to increase. This is because the influence of the S-characteristics will be strengthened when the opening of the guide vanes becomes greater as the running point is moving along the S-characteristics curve towards a higher discharge during this time period.

Further, the temporary opening of said discharge controller by the correction control of the governor output should be continued until the running point reaches the inflection point (at which the speed curve changes from "peak" to "bottom") as the speed decreasing curve decreases along the S-characteristics curve toward a smaller discharge down to this inflection point and reversely moves up toward a greater discharge at this point.

More effectively, the temporary opening of said discharge controller by the governor output control should be started a little before the rotational speed starts to decrease rather than after the rotational speed starts to decrease. (This has no time delay.) Also in this case, the first speed peak remains almost unchanged.

For pump turbines having the S-characteristics, this first speed peak is dependent upon the starting point (N1) of the S-characteristics of the pump turbine at the current opening of the discharge controller or the guide vanes. The N1 change is hardly affected by the opening of the guide vanes.

Next, if the effect of said correction-control is too small, the first discharge decrement after the load rejection becomes too big and a reverse water flow is allowed. Experimentally, the inventors of the present invention have known that the first discharge decrement should be about two thirds of the first speed increment ($\Delta N$) or less.

Namely, said correction-control should be set as standard so that the first speed decrement may be a rated rotational speed (or the natural target speed of the governor) plus about one third of $\Delta N$.

Only one speed change from decrease to increase by the correction-control is preferable to settle the rotational speed after a full load rejection on a value preset by the governor (or a natural target speed of the governor). However, in some cases, sequential repetitive speed changes by said correction-control are preferable because the energy stored by the inertia effect of the rotor is gradually discharged.

In the present invention, said governor should comprise a closing speed limiter which limits the rate of closing the discharge controller according to the opening of the discharge regulator. In case the closing speed limiter is designed to limit the closing speed of the discharge controller to a second predetermined value or below which is comparatively high when the opening of the discharge regulator is a first predetermined value or above or to limit the closing speed of the discharge regulator to a third predetermined value or below which is comparatively low when the opening of the discharge regulator is a first predetermined value or below, in other words in case said speed limiter has a bending function, the protection by the bending function should be assured even if said correction-control fails. In this sense, the governor output correction-control should be disabled while the opening of said discharge controller is over said first predetermined value.

After a load rejection, the rotational speed first decreases, turns at a point (a first bottom speed value) to increase by the correction-control, and then turns at another point (a second peak speed value) to decrease. Said correction-control should be adjusted to make said second peak lower than said peak value (or the first peak value) and gradually discharge the energy stored on the inertia effect of the rotor.

Next, the rotational speed decreases after the second peak value, gradually stops decreasing, and turns at a point (a second bottom speed value) to increase. Similarly, the correction-control should be adjusted to make the second bottom value lower than the first bottom value.

The behavior of the rotational speed is the most preferable to observe the transient phenomenon of a pump turbine upon a load rejection, particularly the behavior of the pump turbine in the S-characteristics region. It not only reflects the phenomenon but also shows a smooth, steady and noise-less curve. Therefore, said governor output correction controller should be so constituted as to at least enter a Rotational Speed signal and correct the output of said arithmetic unit of said governor to open the discharge controller.

Said correction control is not required in the normal operation of the pump turbine while the generator motor is connected to a power generation system and the speed change is very little. Therefore, signals should be entered to said governor output correction controller only when the rotational speed is the fourth predetermined value or more. As the effect of the present invention is to gradually decrease the rotational speed after a load rejection, it is recommended to select a speed-decreasing pattern (model curve) for respective load rejections upon load rejections and control the actual rotational speed in comparison with the speed-decreasing pattern. The second arithmetic unit of said governor output correction controller creates this speed-decreasing pattern (model curve). Generally, actual control timing is delayed if said correction-control is made only according to the difference between the actual rotational speed and the speed-decreasing pattern. To prevent this, differentiation is required. An incomplete differentiation is very convenient for creation of correction signals because the incomplete differentiation of the steady status is always a zero. With these in mind, the governor output correction controller is designed. Substantially, the correction-controller of a pump turbine in accordance with the present invention comprises a first arithmetic unit which allows a rotational speed signal to pass only when the rotational speed goes over a fourth predetermined value, a second arithmetic unit which receives a signal output from the first arithmetic unit and outputs a signal (a target signal) which increases quickly in comparatively quick response to the received signal while the received signal is increasing and decreases slowly in comparatively slow response to the received signal when the received signal starts to decrease, a comparator which compares the target signal and the signal output from the first arithmetic unit and outputs the result (a difference), a first limiting element which limits the positive component of the signal output from the comparator, a differential element which incompletely differentiates the signal output from the first limiting element, and a second limiting element which blocks the negative components of a signal output from the differential element and limits the positive components of the signal at a predetermined value.

As the governor output correction controller is constituted to work only upon a load rejection, it is necessary to make said fourth predetermined value fully higher than the maximum value which may occur during normal operations while said generator motor is connected to an electric power system.

Said second arithmetic unit is made to make a first order lag response of a comparatively short time constant while a signal output from the first arithmetic unit is increasing (because a quick movement along the speed increasing curve is required) or a response of a comparatively long time constant to gradually decrease the rotational speed after the rotational speed starts to decrease again.

Note that a harmful interference may occur when both said governor output correction controller and said governor are working at the same time. To prevent such an interference and mainly enable the governor control with the governor output correction control minimized, the output of the governor output correction controller should be controlled to have a trapezoidal waveform or to change so slowly not to block the governor operation.

As said governor output correction controller mainly works to increase the rotational speed, in some cases, the operation of the correction-control is opposed to recovery of the rotational speed by the governor. As the result of a compromise, it sometimes happens that the rotational speed does not reach a predetermined value. To prevent this, the rotational speed to be correction-controlled should be limited. This is why said governor output correction controller is made to work only when the rotational speed is at a fifth predetermined value or more which is higher than the target value in the steady status.

It is necessary to open a circuit breaker for protection of electric apparatus such as the generator motor when immediately stop a pump turbine running in the Power Generation mode in case of emergency. However, said discharge controller must not be closed quickly instead of using the governor control. If said discharge controller is closed quickly, the S-characteristics controlling of the present invention is made no use of and the great effect of the present invention is lost. Therefore, it is necessary to keep both the governor and said correction controller operative in the early stage of an emergency stop process which is accompanied at least by a speed rise and requires operation in a S-characteristics region, to suppress the influence of the S-characteristics, to perform a natural emergency operation, that is, to fully close said discharge controller, and to stop running of the pump turbine.

Control Circuit Configuration

Figure 12:
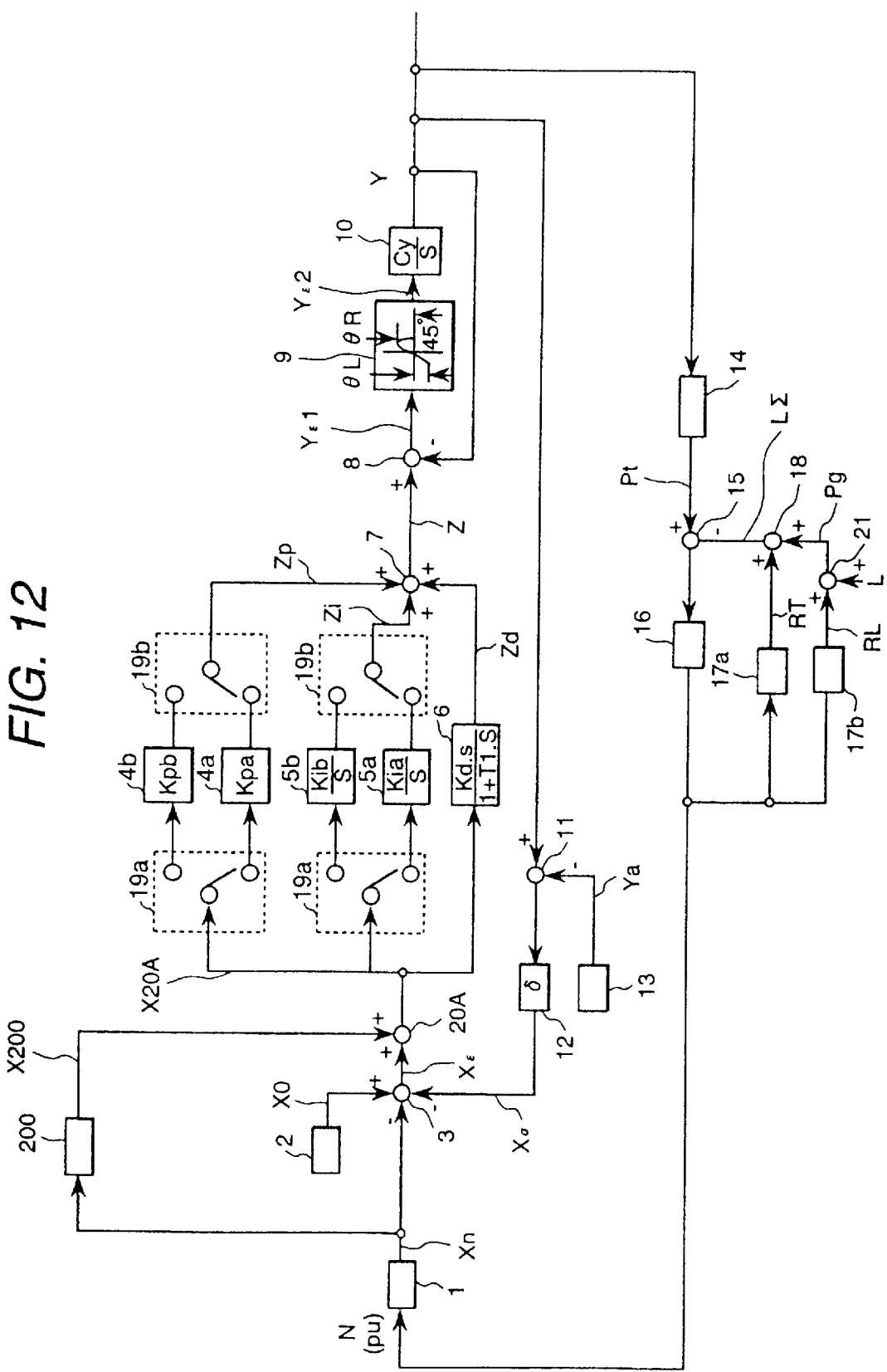
FIG. 12 is a schematic block diagram of the governor according to the present invention.

FIG. 12 is a schematic block diagram of a governor of a pump turbine. This block diagram contains a speed detector 1 for detecting the rotational speed N of a pump turbine 14, a speed detection signal Xn, a speed controller 2 for setting a reference rotational speed, a set value X0 from the speed controller 2, an adder 3, a restoration signal Xσ coming from the speed control rate setting unit, and a signal Xε output from the adder 3, and a correction control signal X200 from a correction control circuit 200. A signal X20A obtained by correcting Xε with the correction control signal X200 is fed to the PID operation circuit just under the signal. A proportion element 4a (P element) is used in a normal power generation mode in which a generator motor is connected to a large power system. A proportion element 4b (P element) is used for no-load operation after a load rejection. The gain Kpa of the proportion element 4a is greater than the gain Kpb of the proportion element 4b.

An integration element 5a (I element) is used in a normal power generation mode. An integration element 5b (I element) is used for no-load operation after a load rejection. The gain Kia of the integration element 5a is greater than the gain Kib of the integration element 5b. Contacts 19a and 19b directly or indirectly detect the ON/OFF status of the circuit breaker for the generator motor (which is not visible in FIG.

12). When the circuit breaker opens, the contacts 19a and 19b simultaneously swing to open the lower contact and close the upper contact. Two contacts on each side 19a or 19b are required to switch the P and I elements at the same time.

The differentiation element 6 (D element) outputs a signal Zd. The contact 19b outputs a signal Zp coming from the proportion element and a signal Zi coming from the integration element.

The adder 7 adds these signals. A signal Z is a total of the output of the proportion element Zp, the output of the integration element Zi, and the output of the differentiation element Zp. The signal Z is a vane opening command signal. An actual vane opening is indicated by a signal Y. The adder 8, the limiter 9, and the oil-pressure servo motor 10 constitutes a kind of oil-pressure amplifier. It constitutes a first order lag element with a limiter as a transfer function and amplifies the vane opening signal Z into a vane opening Y which has a stroke and an operating force strong enough to directly operate the guide vanes which works as a discharge controller. A signal $Y\epsilon1$ indicates a difference between a vane opening command signal Z and an actual vane opening Y. The limiter 9 contains $\theta R$ which limits the vane opening rate to $\theta R$. Cy and $\theta L$ which limits the vane closing speed to $\theta L.Cy$. The signal $Y\epsilon2$ is obtained by limiting the difference signal $Y\epsilon1$ considering said vane opening and closing speed limits. A desired vane opening setting signal Ya is output from the output controller 13 to the adder 11. If the actual vane opening Y is smaller than Ya (or Y<Ya), an Open signal $\sigma$ (Ya-Y) is continuously fed to the PID operation unit until the difference Ya-Y becomes zero. Finally, the actual vane opening Y is equal to the vane opening setting signal Ya and the Open signal $\sigma$ (Ya-Y) stops. The speed control rate setting block 12 sets the above coefficient $\sigma$. In other words, the coefficient $\sigma$ is a gain which determines the ratio of the change of the vane opening Y to the change of the speed detection signal Xn. In general, it is determined considering the role of the relevant plant in the power system or the rate of load sharing. Once it is determined it will never be changed. The governor of the pump turbine also comprises elements of the turbine 14 including a penstock system. The load electric power L of the relevant plant is fed to the generator motor which is directly coupled to the shaft of the turbine. The load electric power RL is supplied from the electric power system. The signal P9 is a combination of load electric powers L and RL or the load of the generator motor. A load characteristic 17b is given from the electric power system. The self-controlling ability block 17a of the turbine 14 is a characteristic block which totals machine losses which increases according to a speed increase, efficiency reduction, and so on. Accordingly, the signal RT indicates a turbine output loss due to the self-control ability accompanied by the change of the rotational speed. Therefore, when viewed from the turbine, RT as well as Pg can be recognized as a kind of load. In other words, their sum can be assumed to be the sum of the loads LE=Pg+RT which consume the output Pt of the turbine. The signal (Pt-L$\Sigma$) is fed to the inertia effect part 16 of the rotor and the output of the inertia effect part 16 of the rotor becomes the rotational speed N. After a load rejection, the signal P becomes equal to the signal L.

Next, the actions of the speed controller 2, the output controller 13, and the speed control rate setting block 12 will be explained referring to FIG. 13 and FIG. 14, assuming that no-load vane opening is 0.2 (pu). The solid line which goes lower towards the right in FIG. 13 indicates the opening of the guide vanes just before the power plant is connected to an electric power system. In other words, the intersection of this solid line and the rated speed N (synchronous speed) line indicates the opening of the guide vanes. The current no-load vane opening is 0.2. This solid is set lower before the turbine starts. For example, the line is placed on the dotted line in FIG. 13. As seen in this drawing, the speed controller 2 moves up or down the solid line in parallel below the solid line in FIG. 13. The name "speed controller" comes as the intersection (no-load vane opening 0.2) moves up and down vertically. Next will be explained the behavior of the intersection after the power plant is connected to an electric power system, referring to FIG. 14. Initially, the intersection of the solid line and the rated speed line is at Y=1.0. This indicates "running at 100% load." This line is dotted in FIG. 13. In this way, the output controller 13 controls the opening of the guide vanes by moving left or right the solid line in parallel. When the power plant is connected to an infinite electric power system, the rotational speed is substantially fixed to 1.0. As the intersection on the line N=1.0 moves left and right according to the horizontal movement of the solid line, the name "speed controller" is given. In the steady status, the pump turbine is operated at a point (N=1.0, Y=1.0) as shown by the solid line in FIG. 14. Let's assume that the frequency of the power system increases by 3% and the rated speed N moves to 1.03. The vane opening Y goes to 0.2. Similarly, assuming that the frequency of the power system increases by 1.5%, the vane opening Y is set to 0.6. In this way, the speed control rate setting block 12 gives a proportional relationship between the frequency change width and the vane opening width. As the gain of the speed control rate setting block 12 increases, the solid line in FIG. 14 decreases more drastically towards the right. And the gain of the vane opening response width to the frequency change decreases. Therefore, if a load rejection occurs while the pump turbine is running at a rated speed (N=1.0) and a full load (100%) (on the solid line in FIG. 14), the governor works to finally set the rotational speed N to 1.03 (higher than the rated value by a controlled speed increment).

FIG. 15 is a typical example showing a vane-closing speed limit of a pump turbine.

Figure 16:
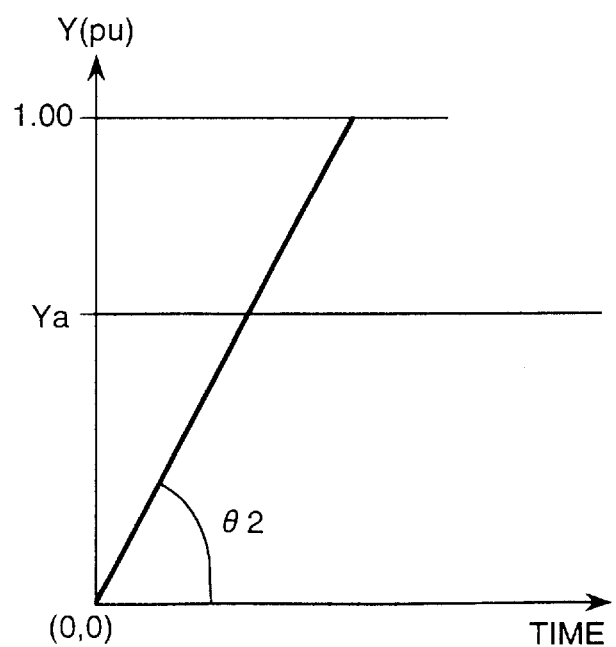
FIG. 16 is a graph explaining the limitation of the opening rate of the guide vanes.
Figure 24:
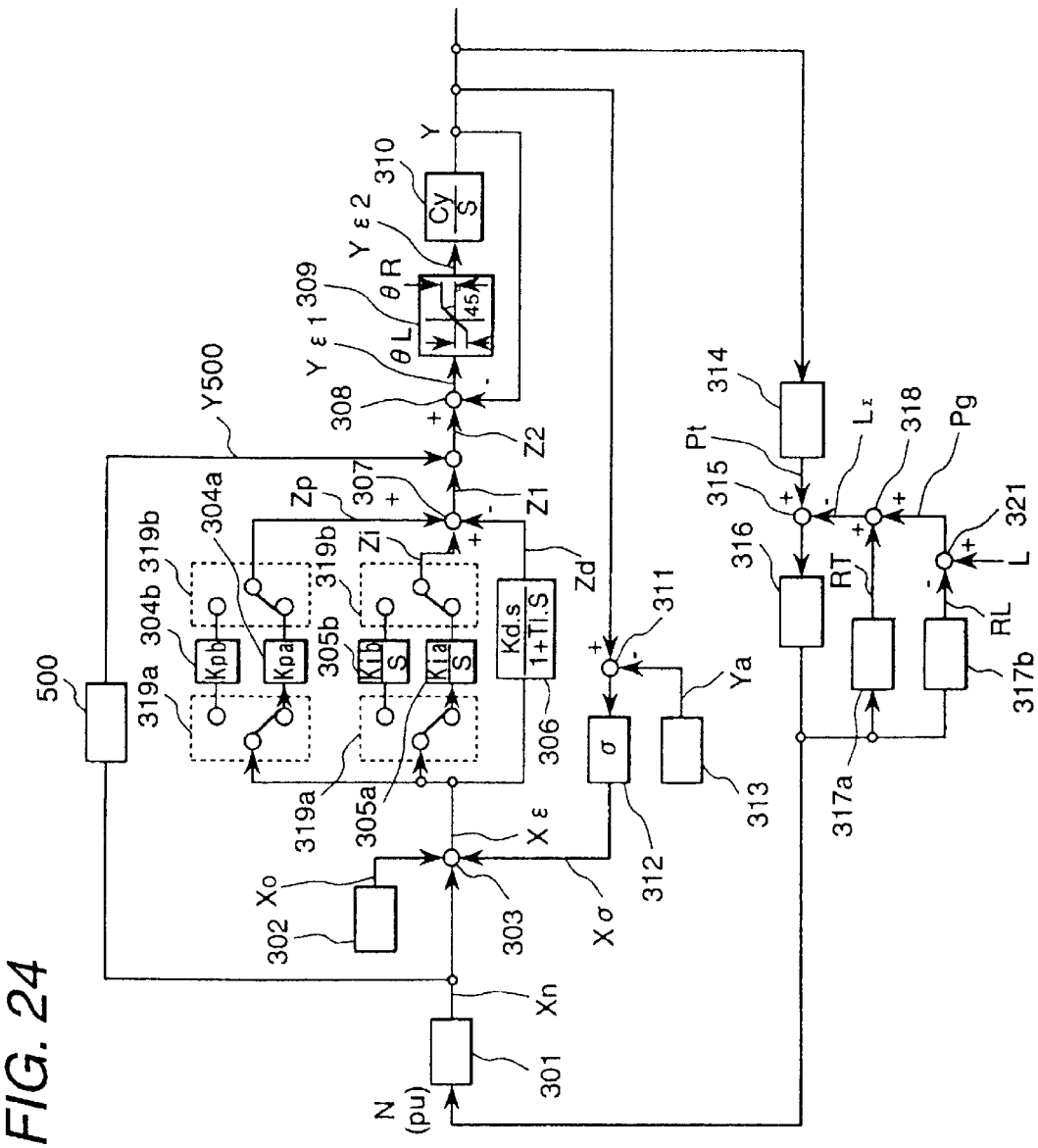
FIG. 24 is a schematic block diagram of the governor in a third embodiment of the present invention.

Conventionally, the rotational speed of a pump turbine is limited so that the gradient of the line may not be greater than $\theta 1a$ if the vane opening Y is greater than a preset vane opening Ya or the gradient of the line may not be greater than $\theta 1b$ (which is smaller than $\theta 1a$) if the vane opening Y is smaller than a preset vane opening Ya. In other words, $\theta L$ of the element 9 shown in FIG. 24 is set to $\tan(\theta 1a)/Cy$ which is comparatively great if the vane opening Y is greater than a preset vane opening Ya or to $\tan(\theta 1b)/Cy$ which is comparatively small if the vane opening Y is smaller than a preset vane opening Ya. On the other hand, as the vane opening operation is not affected by the S-characteristics as in the vane closing operation, $\theta L$ of the element 9 is set to $\theta 2$ satisfying $|\theta 1a|>|\theta 2|>\theta 1b|$ independently of a vane opening, as shown in FIG. 16.

Figure 17:
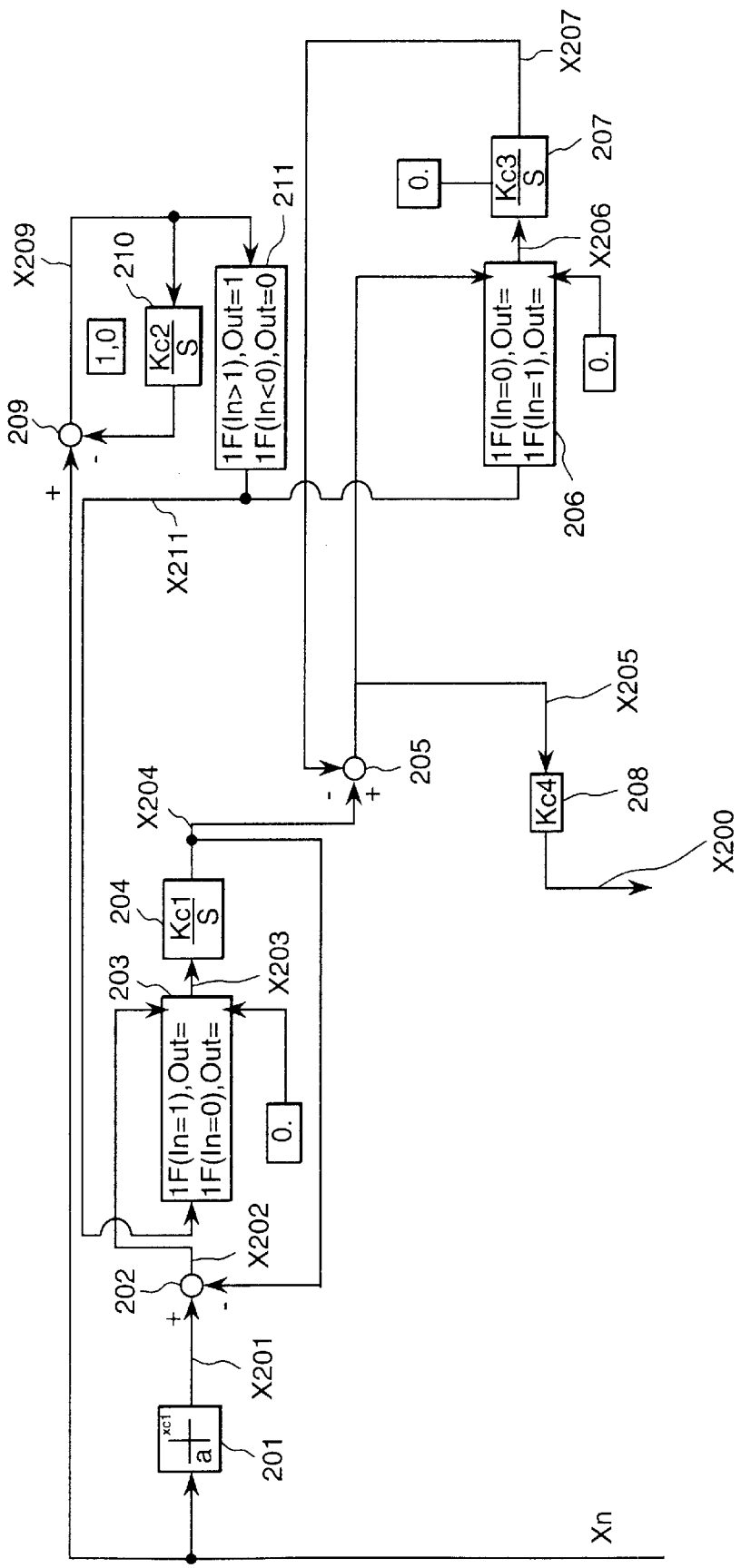
FIG. 17 is a schematic block diagram of the correction limiting circuit.

FIG. 17 shows a schematic block diagram of the correction-control circuit 200 referred in FIG. 12 in the governor of the present invention. The correction-control circuit receives an Xn speed detection signal and outputs X200. The correction control circuit contains an adder 209 and an integrator 210. At the start of a load rejection, the integrator 210 has an initial value of 1.0 which is equivalent to the rated rotational speed. The output X209 of the adder 209 is an incomplete differentiation of Xn. You can tell by X209 whether dN/dt is positive (increasing speed) or negative (decreasing speed).

A switch circuit 211 outputs 1.0 when X209 is positive and 0 when X209 is negative. A circuit 201 works as a passivity element which passes only Xn that is greater than a preset value Xc1. The value Xc1 should be greater than Xn=0.1 which is equivalent to the rated speed and cannot be obtained in the normal operation in which the generator motor is connected to the electric power system and can be obtained only when a load is rejected. For example, the value Xc1 to be set is 1.04 to 1.05. A relay element 203 outputs a signal X202 coming from an adder 202 when the output X211 of the switch 211 is positive or a zero when the output X211 of the switch 211 is negative. An integrator 204 receives a signal X203 output from the relay element 203. With these, a response of the signal X204 to the signal X201 is a first order lag response of a time constant 1/Kc1 (gain 1) while the rotational speed is increasing or remains unchanged on a value (which is just before the speed starts to decrease) while the speed is decreasing. The time constant 1/Kc1 is much smaller than a time constant 1/Kc3 (to be explained later). An adder 205 subtracts a signal 207 (to be explained later) from the signal 204 and produces a signal X205. A relay element 206 outputs a signal X206 coming from the adder 205 when the output 211 of the switch 211 is negative or a zero when the output 211 of the switch 211 is positive. An integrator 207 receives a signal X206 coming from the relay element 206.

With these, a response of the signal X205 to the signal X204 is an incomplete differentiation which slowly decreases the signal X204 exponentially while the speed is decreasing. Its time constant is 1/Kc3 and the gain is 1. On the other hand, as the value of the signal X204 increases while the speed is increasing and the signal X207 retains a value just before the speed starts to increase, the value of the signal 205 increases. In other words, the value of the signal X205 increases as the speed is increasing and slowly decreases exponentially when the speed starts to decrease. This is equivalent to the speed change model curve upon a load rejection.

Figure 18:
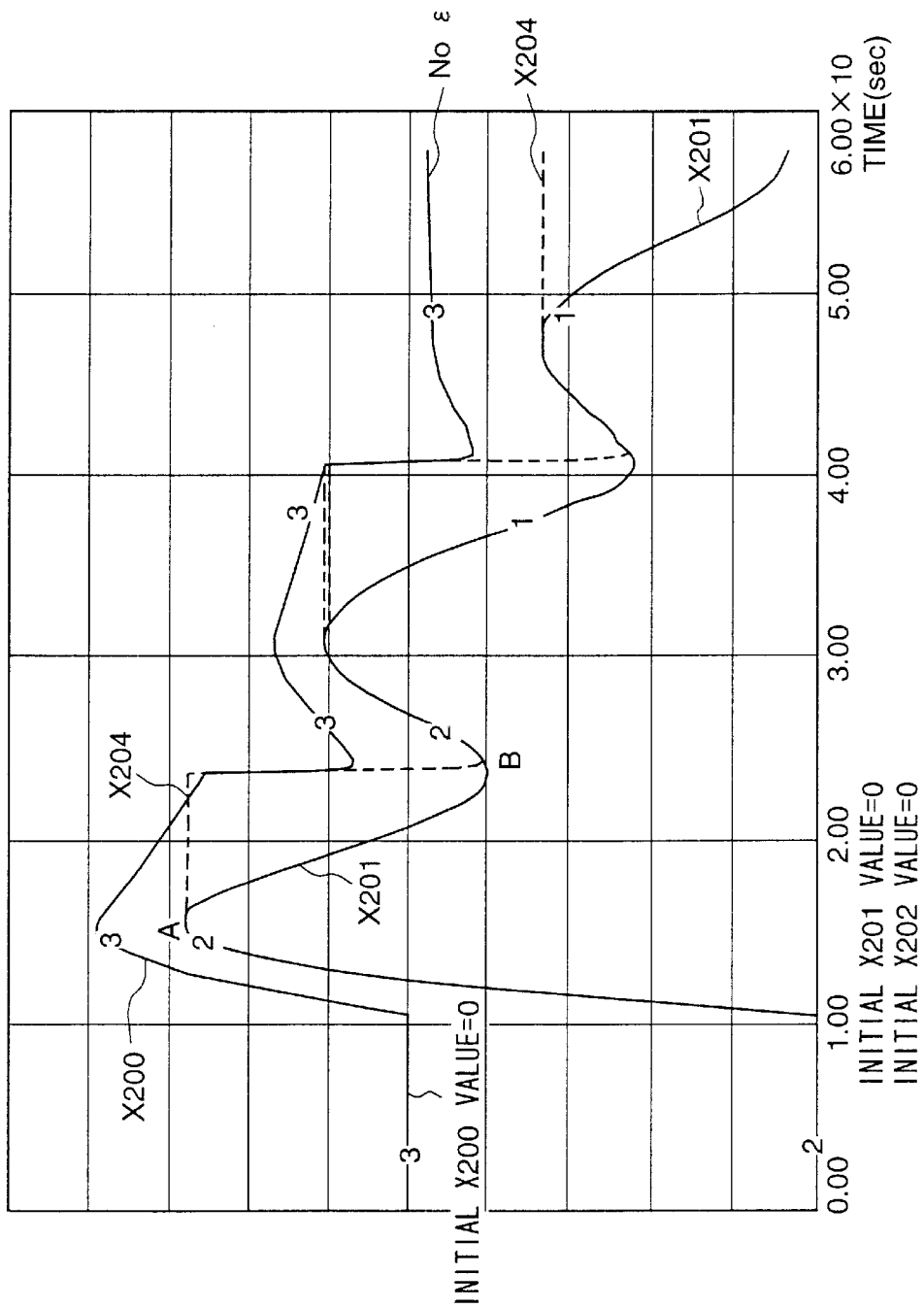
FIG. 18 is a graph explaining the operation of the correction limiting circuit.

The operation of the correction control circuit 200 will be explained below referring to accompanying drawings. In FIG. 18, a curve X201 indicates the behavior of the signal X201 obtained by passing the speed detection signal Xn through the passivity element (1.04 to 1.05). A product of the gain Kc4 by the first order lag signal (time constant of 1/Kc1) of the signal 201 is output as a correction signal X200. Accordingly, the correction signal X200 changes approximately like the signal X201 until a time point X201. Therefore, the actual number of revolutions Xn increases until a time point 201A and a correction-control signal X200 increases in a time-lag-of-first-order manner.

Then, the actual number of revolutions Xn decreases down to a time point X202A. During this time period, the signal X204 retains the value of the time point X201A set by the relay element 203 (the dotted part). The incomplete differentiation circuit containing an integrator 207 receives this signal X204, makes an incomplete differential response of a comparatively long time constant (time constant of 1/Kc3), and produces a signal X207 which is a reducing signal of the signal X204. The signal is output as a correction-control signal X200. In other words, a value which gradually decreases from a value at a time point X201A is output as a correction-control signal X200 between time points X201A and X202A.

Next will be explained the behavior of the vane opening signal Z with this correction-control signal X200 in mind, referring to FIG. 12, FIG. 19, and FIG. 21. The signal Xε from the adder 3 and the correction-control signal X200 are added into an input signal X20A (or X20B). This input signal X20A is PID-procesed (or the input signal X20B is PI-processed) and the result is output as a vane opening instruction Z.

Figure 21:
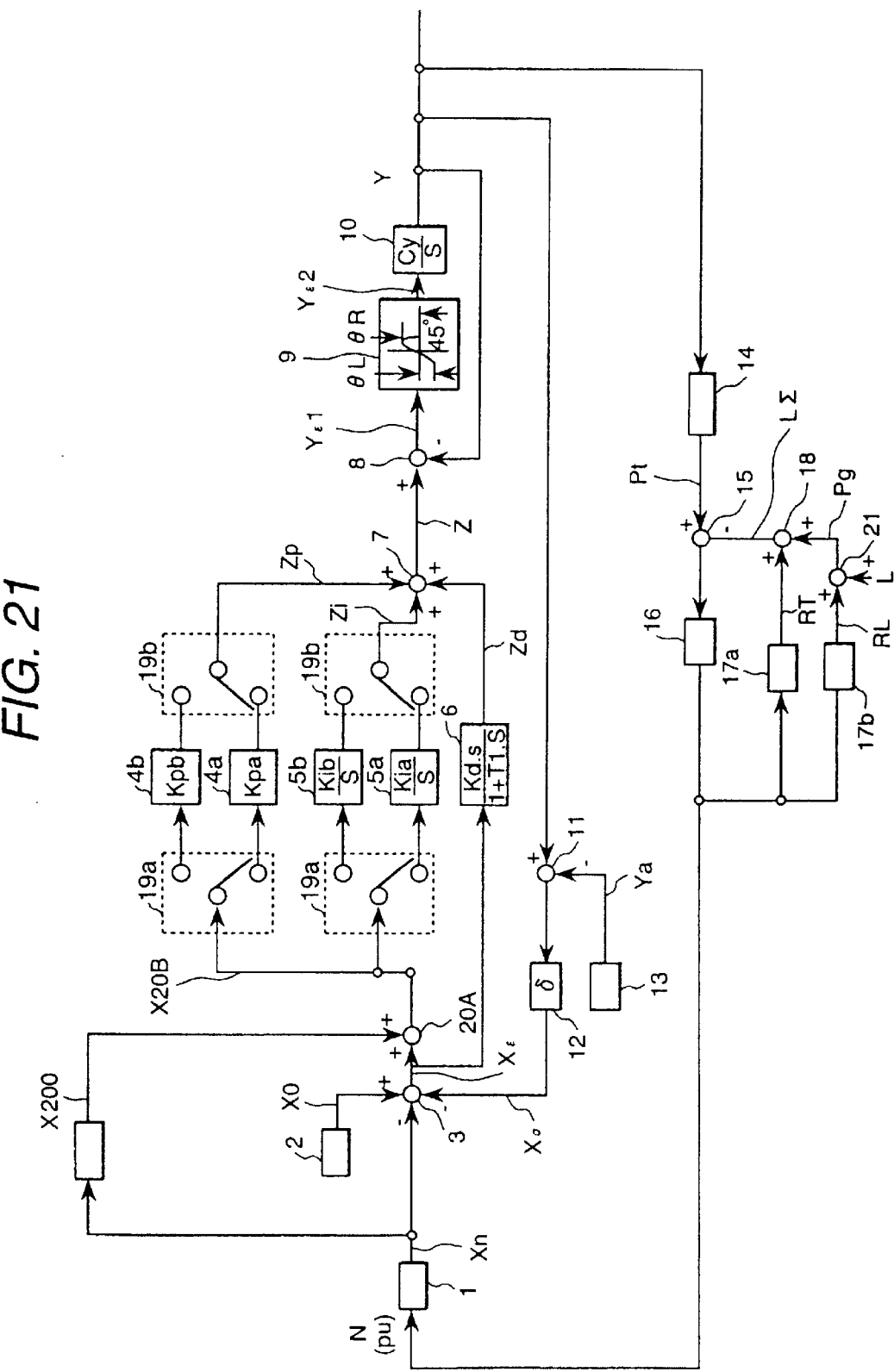
FIG. 21 is a schematic block diagram of the governor in a second embodiment of the present invention.

FIG. 21 is a schematic block diagram of a control circuit which is a modification of the embodiment of FIG. 12. The differentiation element 6 (D element) inputs Xε. The input X20B of the PI operation circuit is obtained by correcting the signal Xε with the correction-control signal X200. Namely, the correction-control circuit directly has influences only upon the proportion element (P element) and the integration element (I element). The other circuit configuration is the same as that of FIG. 12. Their details are omitted here.

Figure 22:
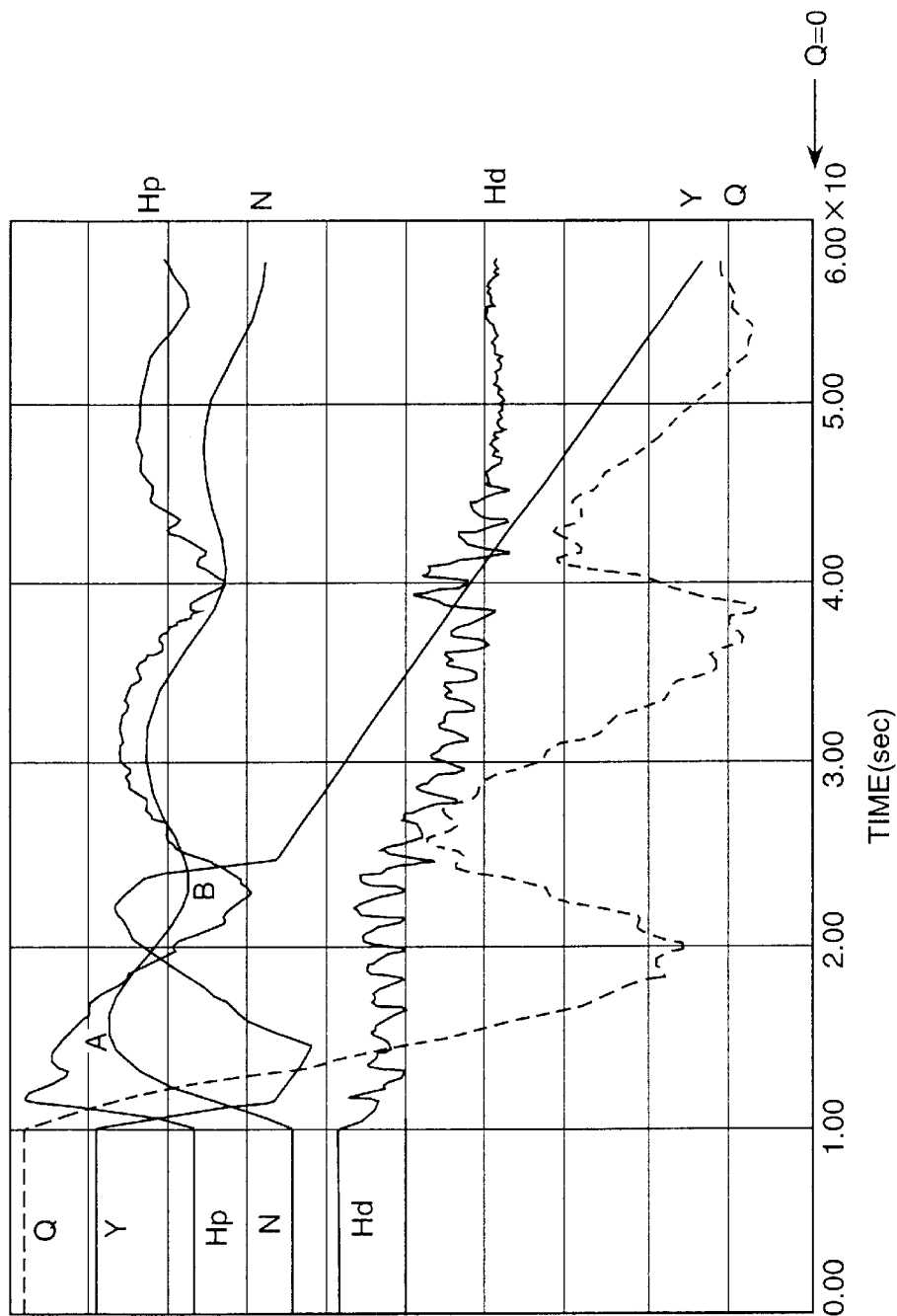
FIG. 22 is an operational chart of the whole system according to the present invention.

FIG. 22 shows a time response of a pump turbine which employs the above embodiments of FIG. 21 and FIG. 17 upon a load rejection. FIG. 22 shows transitions of the vane opening Y, the rotational speed N, the discharge Q, the inlet water pressure Hp of the turbine, and the outlet water pressure Hp of the turbine upon a load rejection.

Figure 23:
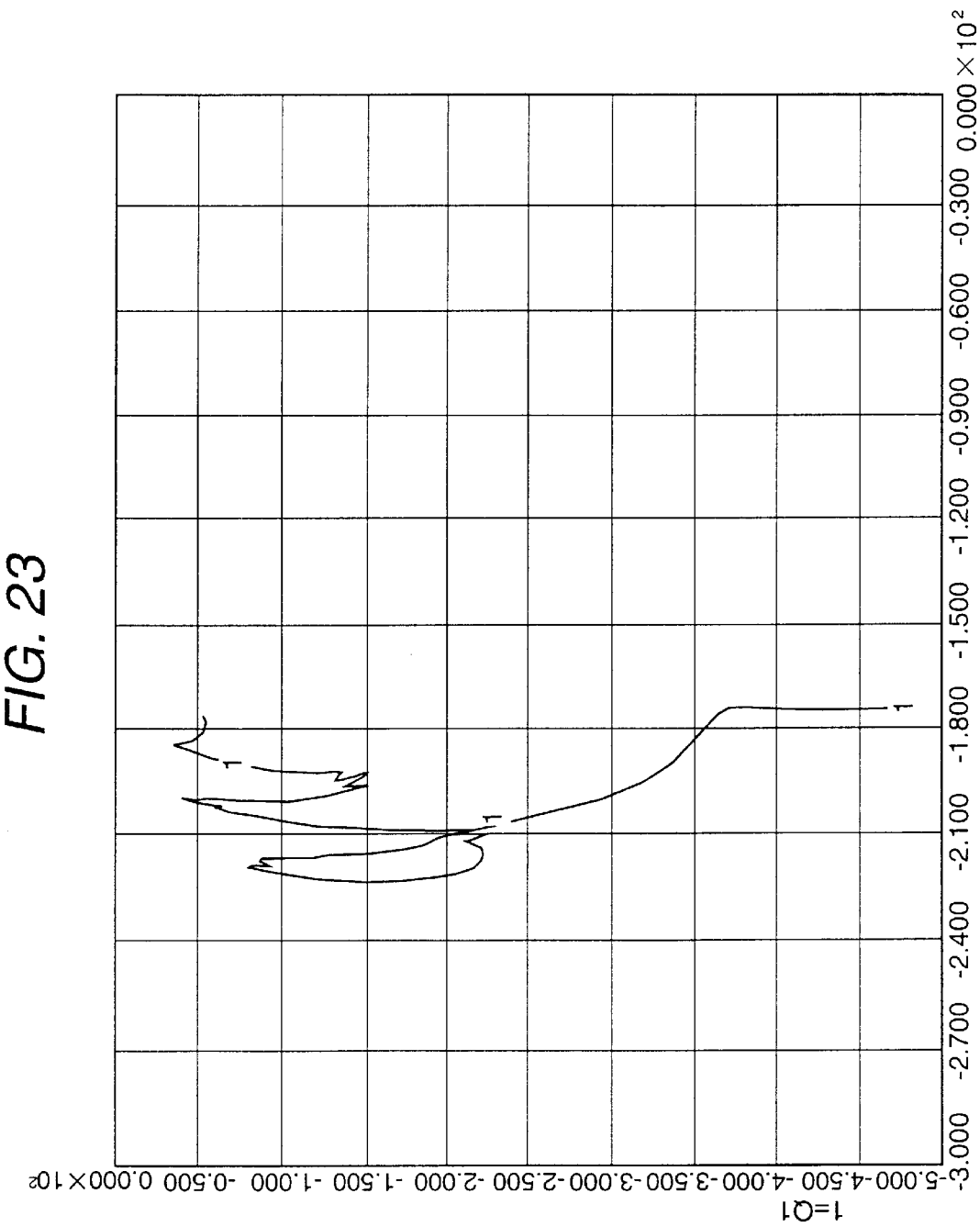
FIG. 23 is a graph explaining the unit-discharge versus unit-speed trajectory according to FIG. 22.

As the correction-control works on the guide vanes to open them while the rotational speed is decreasing, it never happens that the rotational speed falls straight down to a value predetermined by the governor (the rated speed plus the speed control rate) in the first speed-decreasing step. Similarly, the water discharge also attenuates towards a non-load discharge smoothly without a temporary counter-flow (pump-running flow). FIG. 23 shows how the running point of the pump turbine behaves on the N1-vs-Q1 complete characteristics upon a load rejection. From this movement (locus), it is easily understood that the vibration specific to the S-characteristics (which makes the discharge swing before and after the non-load operation) is greatly suppressed. The effect is more apparent in comparison with the graph of FIG. 17. FIG. 18 and FIG. 19 show the behavior of each component of the vane correction-control circuit of FIG. 17 which extracts responses of FIG. 22 and FIG. 23. FIG. 20 shows the output of each operational element of the PID governor in this status.

Figure 19:
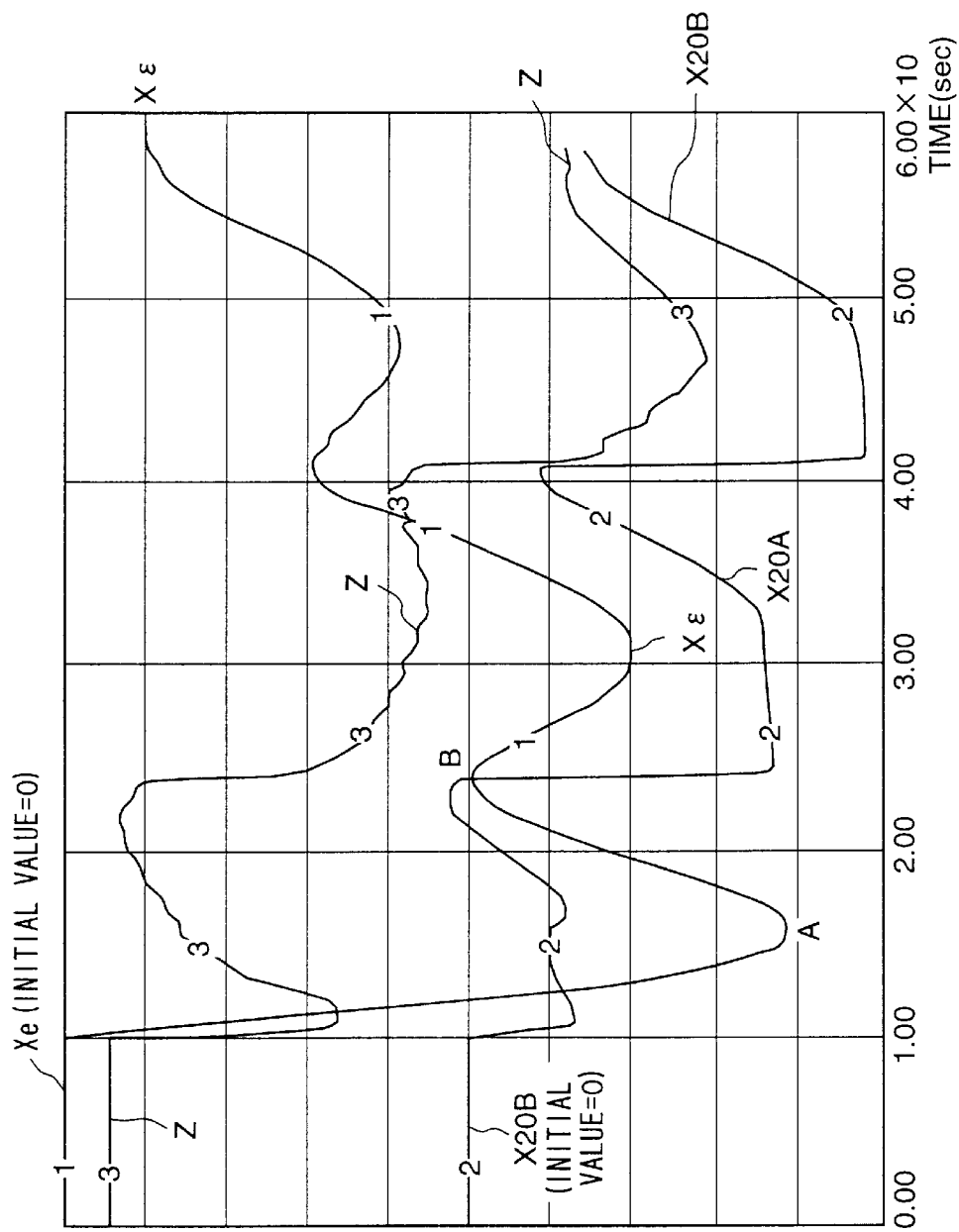
FIG. 19 is an operational chart of the whole governor.
Figure 20:
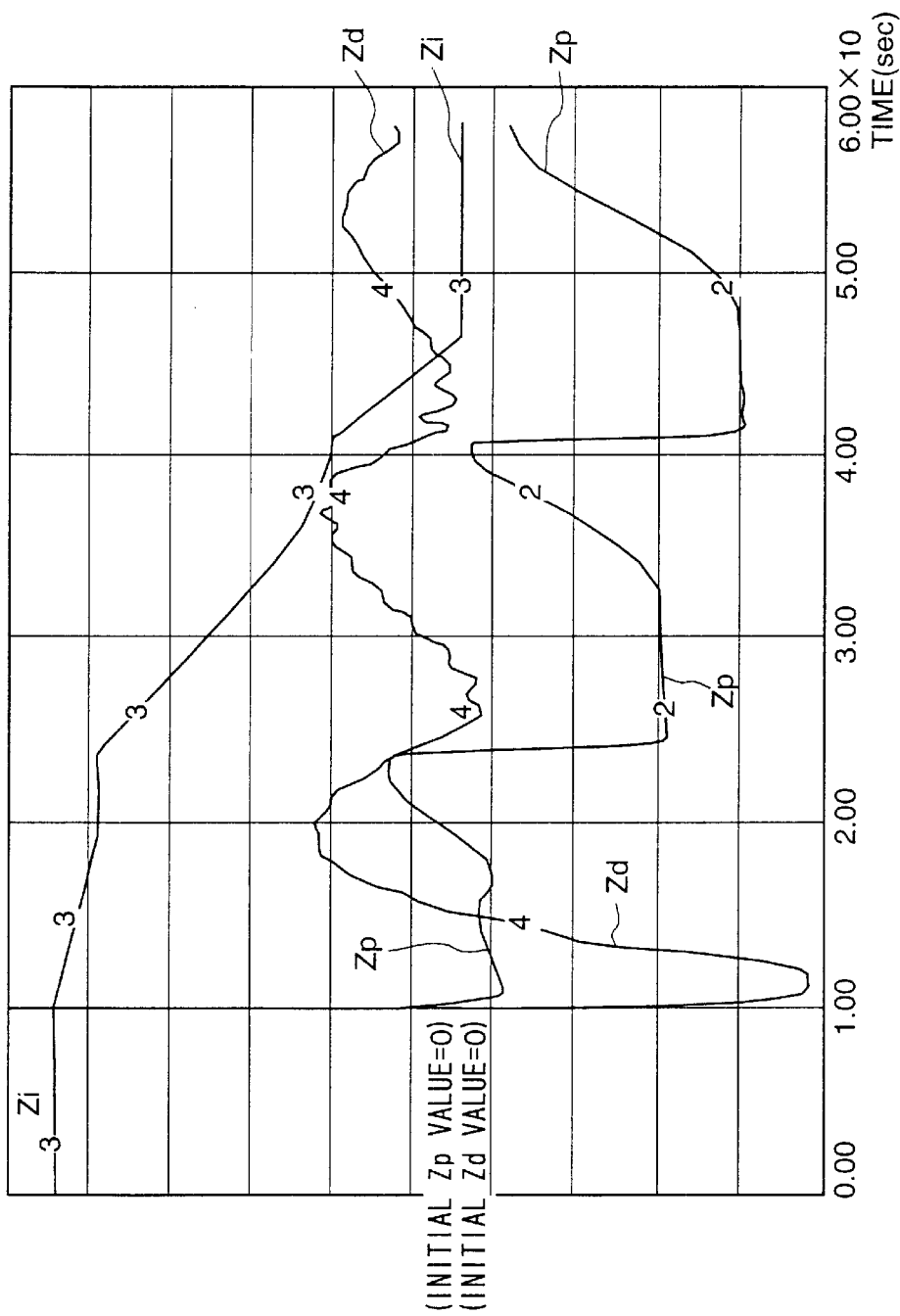
FIG. 20 is an operational chart of the PID controller.

With this, the behavior of the final vane opening instruction is expressed by the graph Z in FIG. 19.

Needless to say, the present invention can be applied to a pumping-up power system using a conventional synchronous machine.

It is to be expressly understood, however, that the above embodiments are for the purpose of easy comprehension only and is not intended as a definition of the limits of the invention.

The effect of the present invention is apparent from the above. Namely as shown in FIG. 22, the discharge smoothly converges to the no-load discharge without any excessive discharge fluctuation upon a load rejection. For this purpose, the upstream water pressure increment, particularly the second peak Hpy, is made lower or almost deleted in extreme cases. In spite of the conventional control limitation that the first peak Hpx must be smaller than the second peak Hpy under any condition, this effect can greatly reduce the first peak Hpx. As the result, it is possible to greatly reduce the designed water pressures in the upstream penstock and in the pump turbine itself. Similarly, it is possible to greatly reduce the range of a water pressure drop of the downstream penstock due to the S-characteristics. Particularly, it is possible to eliminate abnormal spikes caused by mutual interference of pump turbines which share a downstream penstock. With this, the pump turbines can be installed higher on the same level of the lower reservoir, reducing the quantity of soil to be dug (in case of an underground power station).

Further, the effect of the present invention can greatly compress the range of an extraordinary discharge fluctuation due to the S-characteristics. This can greatly reduce a transient water thrust fluctuation upon the pump turbine, which leads to a rationalized designing of thrust shafts. Conventionally, to suppress extraordinary hammering interferences on pump turbines which share an up- or downstream penstock, the operations of the pump turbines are limited. The effect of the present invention frees the pump turbines from these limitations and allows the pump turbines to run without any limitation.

Furthermore, the effect of the present invention can suppress an unwanted discharge fluctuation upon a load rejection, which leads to reduction of vibrations and noises, and further to longer service lives of the pump turbines. It is apparent that the above-mentioned effects all contribute to construction cost reduction of a pumping-up power plant. Additionally, the present invention can be attained just by adding a correction-control circuit to the governor of the pump turbine. Particularly, for a microprocessor type governor which can load operation programs from the outside, the present invention can be attained just by updating the operation programs.

The present invention can reduce the rise of the upstream water pressure upon a load rejection, which leads to reduction of designed water pressures in the upstream penstock and the pump turbines and consequently to reduction of costs for pressure-tight designing. Further, as the effect of the present invention can reduce the range of a downstream water pressure drop upon a load rejection, the pump turbines can be installed on shallower locations, which leads to reduction the quantity of soil to be dug (in case of an underground power station) and the resulting construction cost.

Further, the effect of the present invention can suppress a detrimental mutual hammer interference among pump turbines which share an upstream or downstream penstock. Consequently, the conventional operational limitations on the pump turbines can be abolished.

The effect of the present invention can suppress a discharge fluctuation upon a load rejection, which enables rational designing of thrust metal which can eliminate water thrust in the transient status.

The effect of the present invention can make the operation of pump turbines stable upon a load rejection. A third embodiment of the present invention will be explained below referring to accompanying drawings. FIG. 24 is a schematic block diagram of a governor of a pump turbine which is the third embodiment of the present invention. This block diagram contains a speed detector 301 for detecting the rotational speed N of a pump turbine 314, a speed detection signal Xn, a speed controller 302 for setting a reference rotational speed, a set value X0 from the speed controller 302, an adder 303, a restoration signal Xϵ coming from the speed control rate setting unit, a signal Xc output from the adder 303, and a correction control signal Y500 from a correction control circuit 500. This correction control signal corrects the output Z1 of the PID operation circuit of the governor and finally becomes the output of the governor. A proportion element 304a (P element) is used in a normal power generation mode in which a generator motor is connected to a large power system. A proportion element 304b (P element) is used for no-load operation after a load rejection. The gain KPa of the proportion element 304a is greater than the gain KPb of the proportion element 304b. An integration element 305a (I element) is used in a normal power generation mode. An integration element 305b (I element) is used for no-load operation after a load rejection. The gain Kia of the integration element 305a is greater than the gain Kib of the integration element 305b. Contacts 319a and 319b directly or indirectly detect the ON/OFF status of the circuit breaker for the generator motor (which is not visible in FIG. 24). When the circuit breaker opens, the contacts 319a and 319b simultaneously swing to open the lower contact and close the upper contact. Two contacts on each side 319a or 319b are required to switch the P and I elements at the same time.

The differentiation element 6 (D element) outputs a signal Zd. The contact 319b outputs a signal Zp coming from the proportion element and a signal Zi coming from the integration element. These signals are added by the adder 307. A signal Z1 is a vane opening command signal before the correction-control and a total of the output Zp of the proportion element, the output Zi of the integration element, and the output Zd of the differentiation element. An actual vane opening obtained by amplifying the vane opening command signal Z2 after correction control is indicated by a signal Y.

The adder 308, the limiter 309, and the oil-pressure servomotor 310 constitutes a kind of oil-pressure amplifier. It constitutes a first order lag element with a limiter as a transfer function and amplifies the vane opening signal Z2 into a vane opening Y which has a stroke and an operating force strong enough to directly operate the guide vanes which works as a discharge controller. A signal Yϵ1 indicates a difference between a vane opening command signal Z2 and an actual vane opening Y. The limiter 309 contains θR which limits the vane opening rate to θR.Cy and θL which limits the vane closing speed to θL.Cy. The signal Yϵ2 is obtained by limiting the difference signal Yϵ1 considering said vane opening and closing speed limits.

A desired vane opening setting signal Ya is output from the output controller 13 to the adder 11. If the actual vane opening Y is smaller than Ya (or Y<Ya), an Open signal σ (Ya−Y) is continuously fed to the PID operation unit until the difference Ya−Y becomes zero. Finally, the actual vane opening Y is equal to the vane opening setting signal Ya and the Open signal σ (Ya−Y) tops. The speed control rate setting block 312 sets t above coefficient a. In other words, the coefficient σ is a gain which determines the ratio of the change of the vane opening Y to the change of the speed detection signal Xn. In general, it is determined considering the role of the relevant plant in the power system or the rate of load sharing. Once it is determined it will never be changed. The governor of the pump turbine also comprises elements of the turbine 314 including a penstock system. The load electric power L of the relevant plant is fed to the generator motor which is directly coupled to the shaft of the turbine. The load electric power RL is supplied from the electric power system. The signal Pg is a combination of load electric powers L and RL or the load of the generator motor. A load characteristic 317b is given from the electric power system. The self-controlling ability block 317a of the turbine 314 is a characteristic block which totals machine losses increases according to a speed increase, efficiency reduction, and so on. Accordingly, the signal RT indicates a turbine output loss due to the self-control ability accompanied by the change of the rotational speed. Therefore, when viewed from the turbine, RT as well as Pg can be recognized as a kind of load. In other words, their sum can be assumed to be the sum of the loads LE=Pg+RT which consume the output Pt of the turbine. The signal (Pt−LΣ) is fed to the inertia effect part 316 of the rotor and the output of the inertia effect part 316 of the rotor becomes the rotational speed N. After a load rejection, the signal P becomes equal to the signal L.

Figure 13:
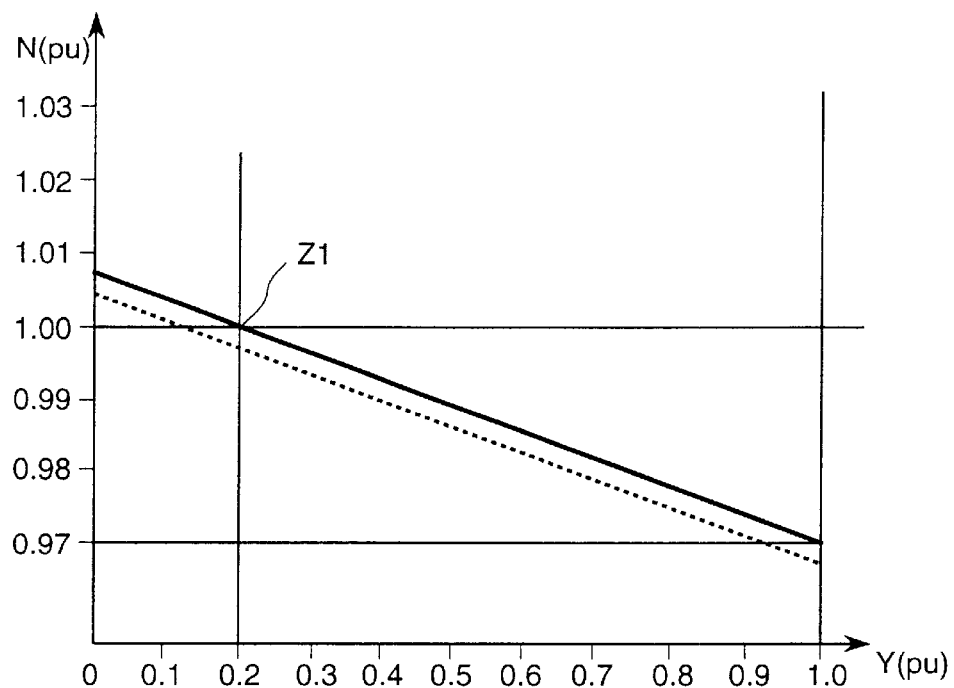
FIG. 13 is a graph explaining speed governing.
Figure 14:
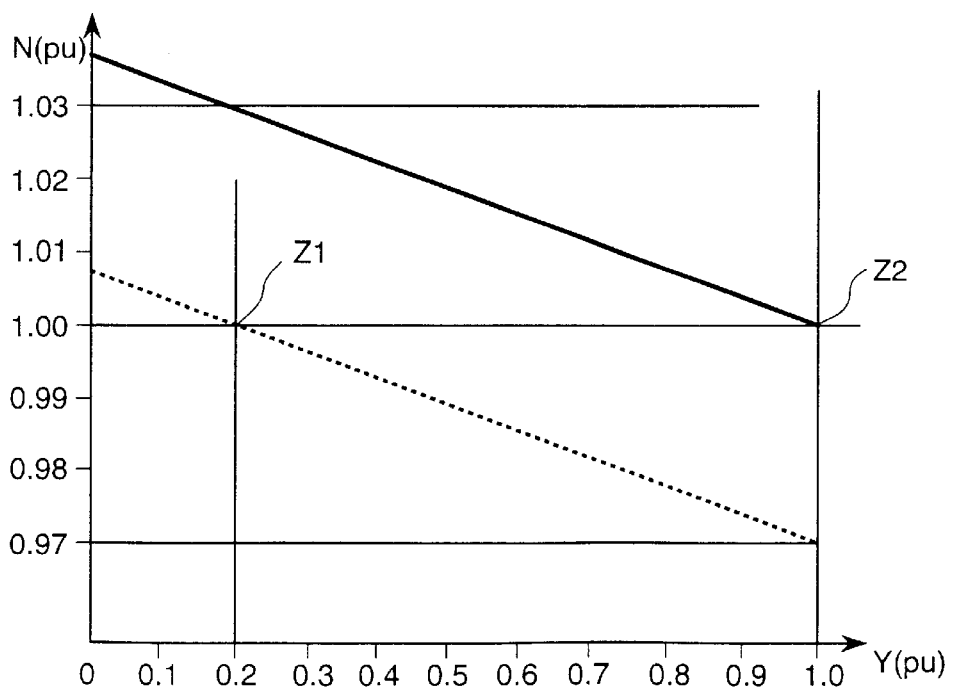
FIG. 14 is a graph explaining speed governing.

Next, the actions of the speed controller 302, the output controller 312, and the speed control rate setting block 312 are omitted here because they are the same as those of the first embodiment of FIG. 13 and FIG. 14. Similarly, limitations of the vane closing speed and the vane opening speed of a pump turbine will not be explained here because they are the same as those of the first embodiment of FIG. 15 and FIG. 16.

Figure 25:
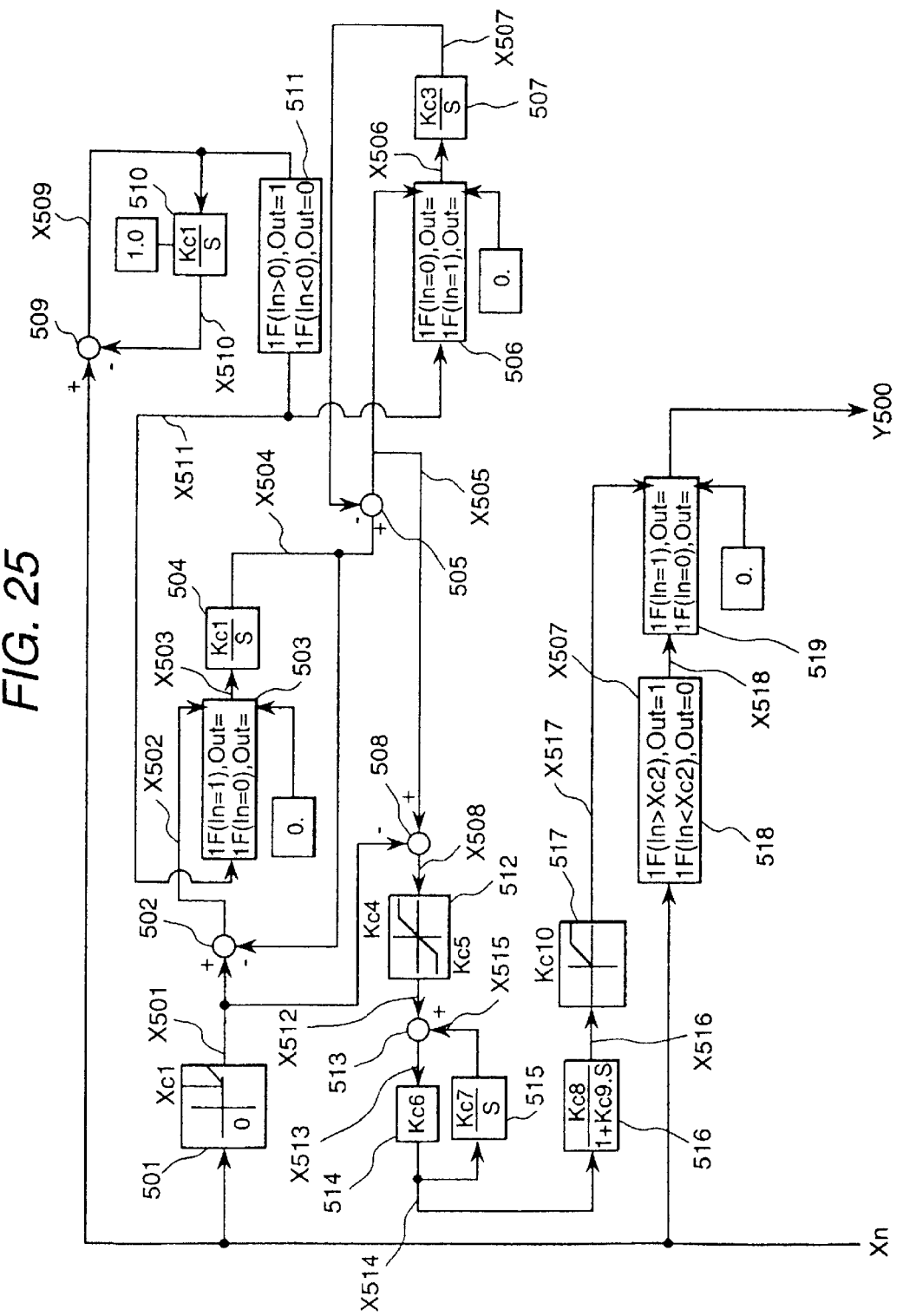
FIG. 25 is a detailed block diagram of the correction limiting circuit in a third embodiment of the present invention.
Figure 26:
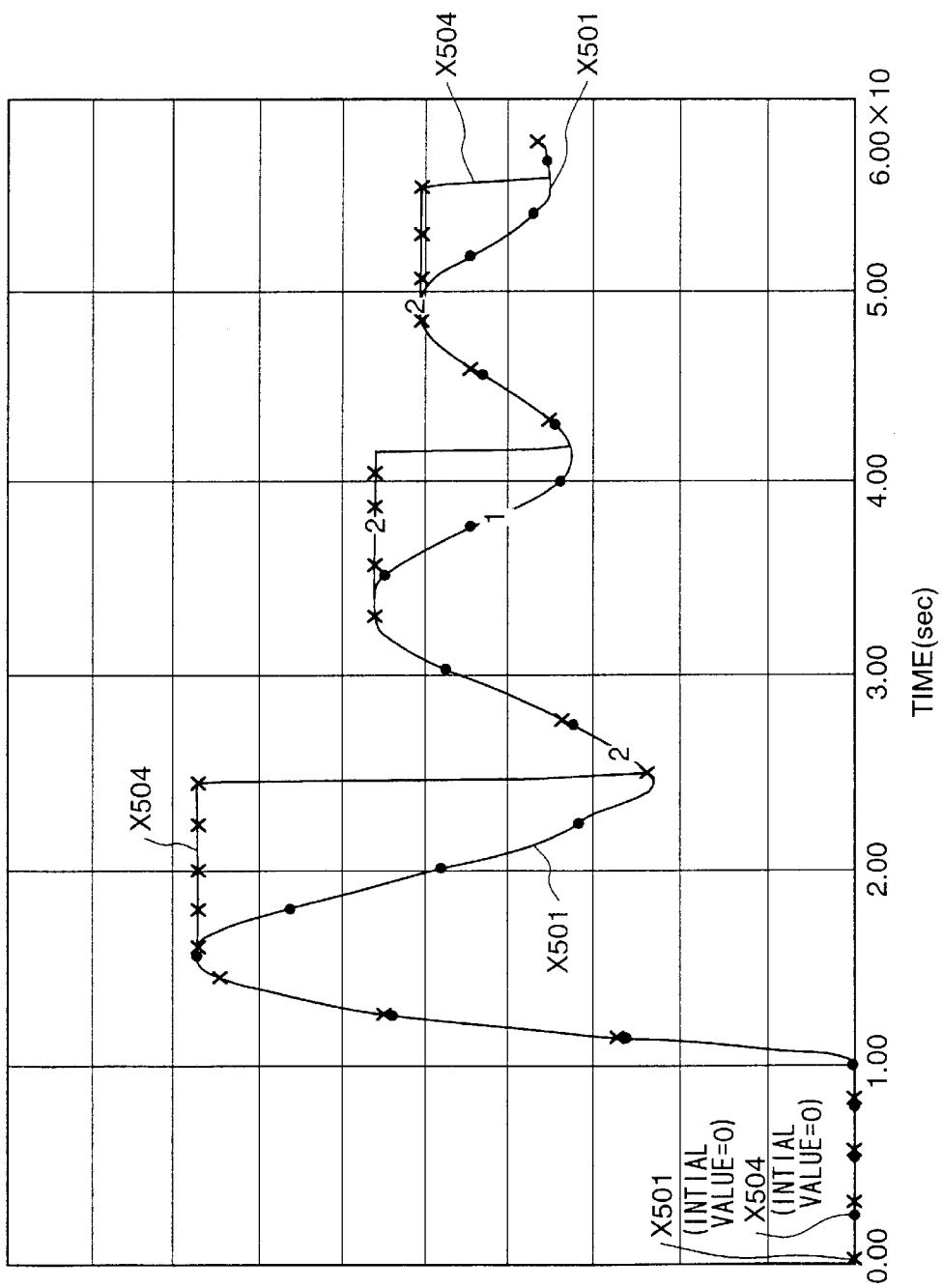
FIG. 26 is an operational chart of the correction limiting circuit in a third embodiment of the present invention.
Figure 27:
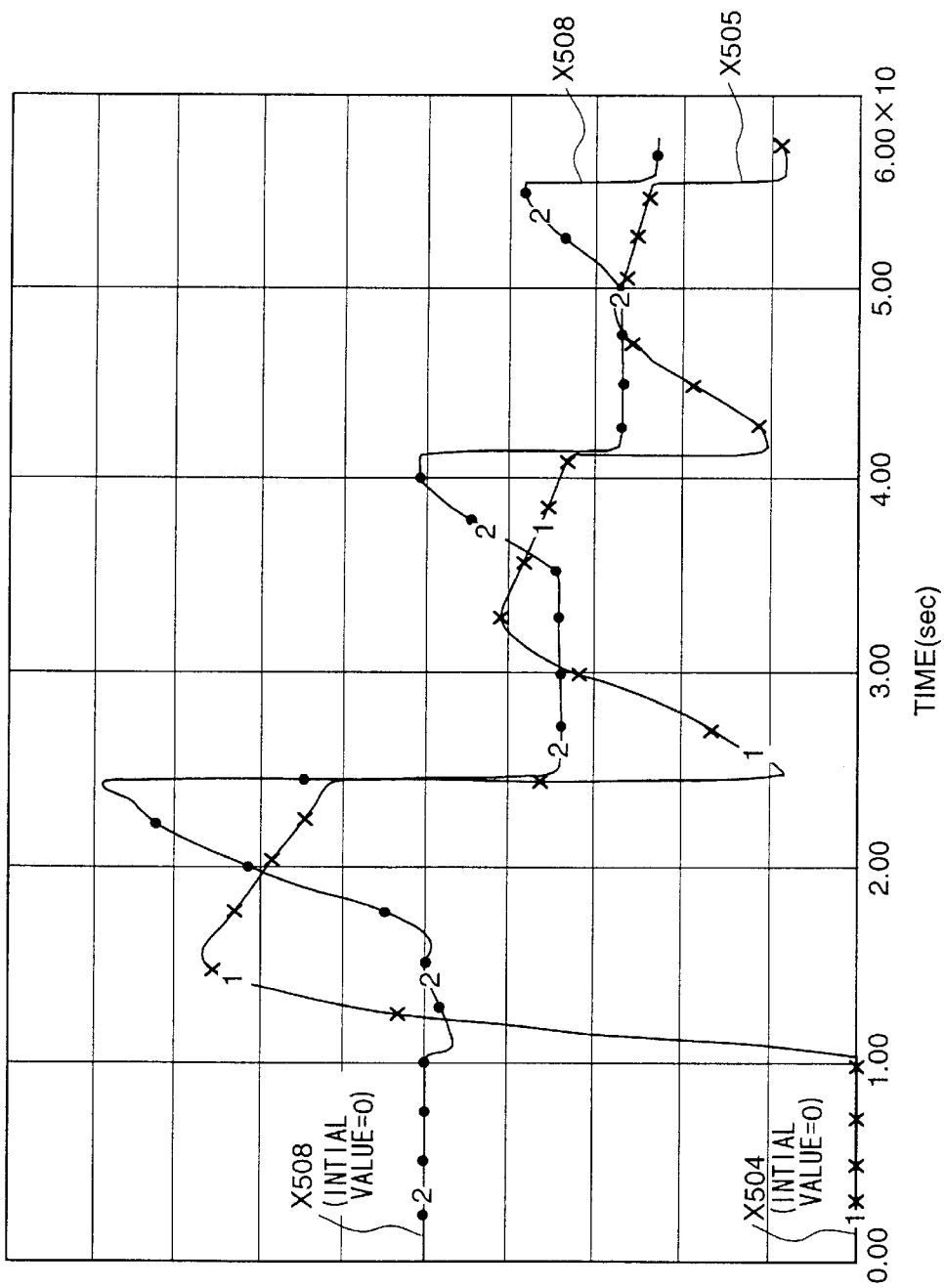
FIG. 27 is an operational chart of the correction limiting circuit in a third embodiment of the present invention.
Figure 28:
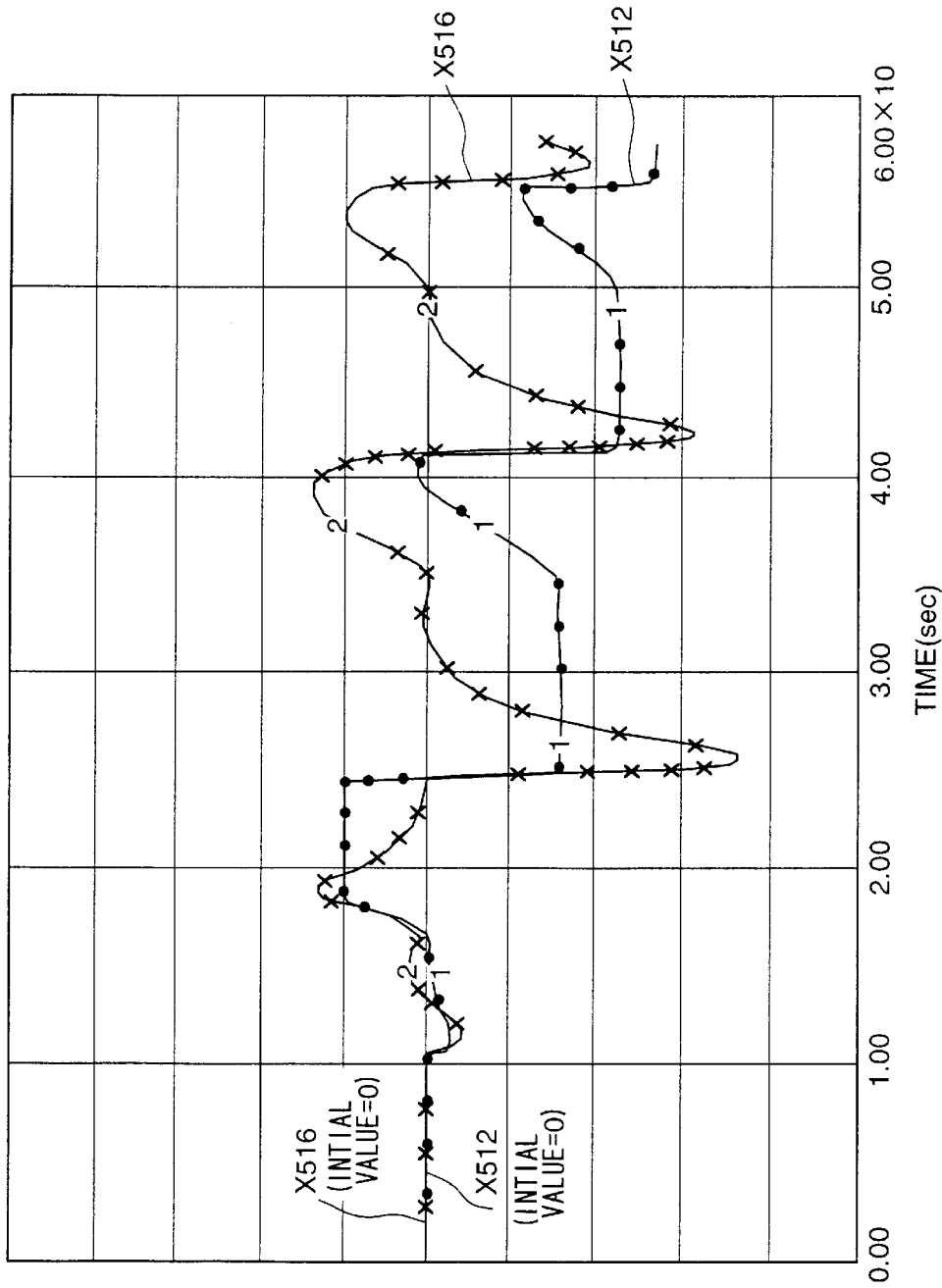
FIG. 28 is an operational chart of the correction limiting circuit in a third embodiment of the present invention.
Figure 29:
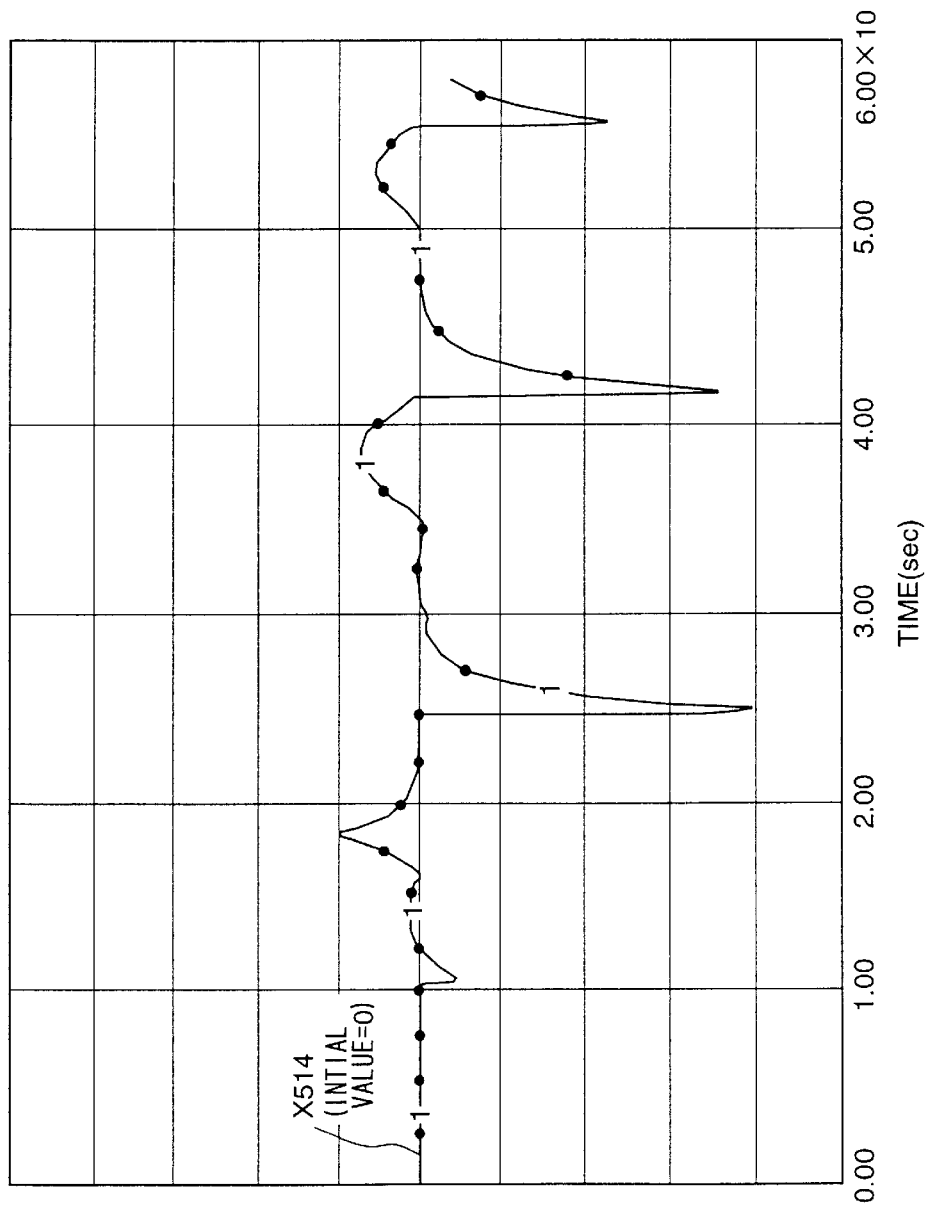
FIG. 29 is an operational chart of the correction limiting circuit in a third embodiment of the present invention.
Figure 30:
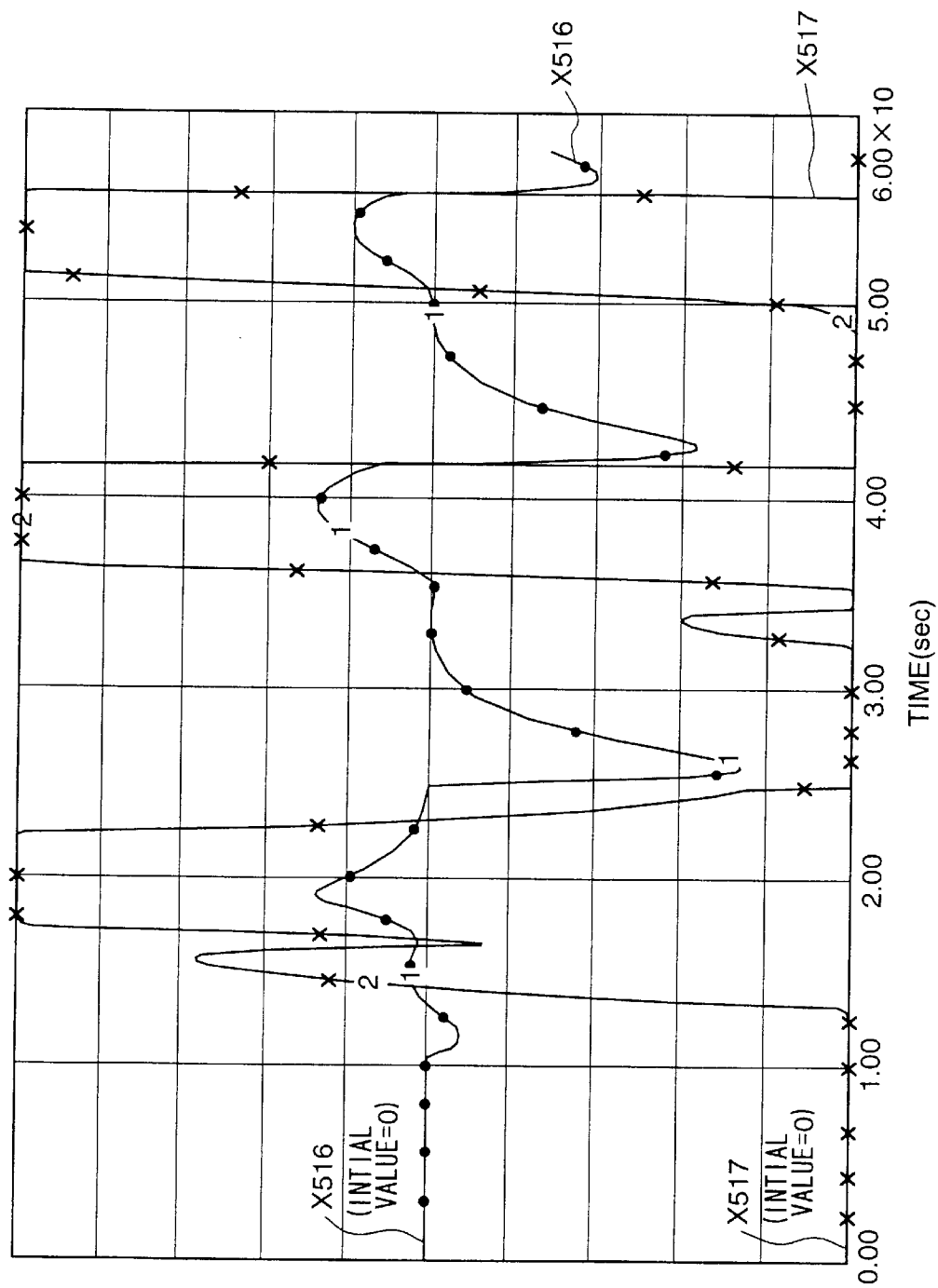
FIG. 30 is an operational chart of the correction limiting circuit in a third embodiment of the present invention.
Figure 31:
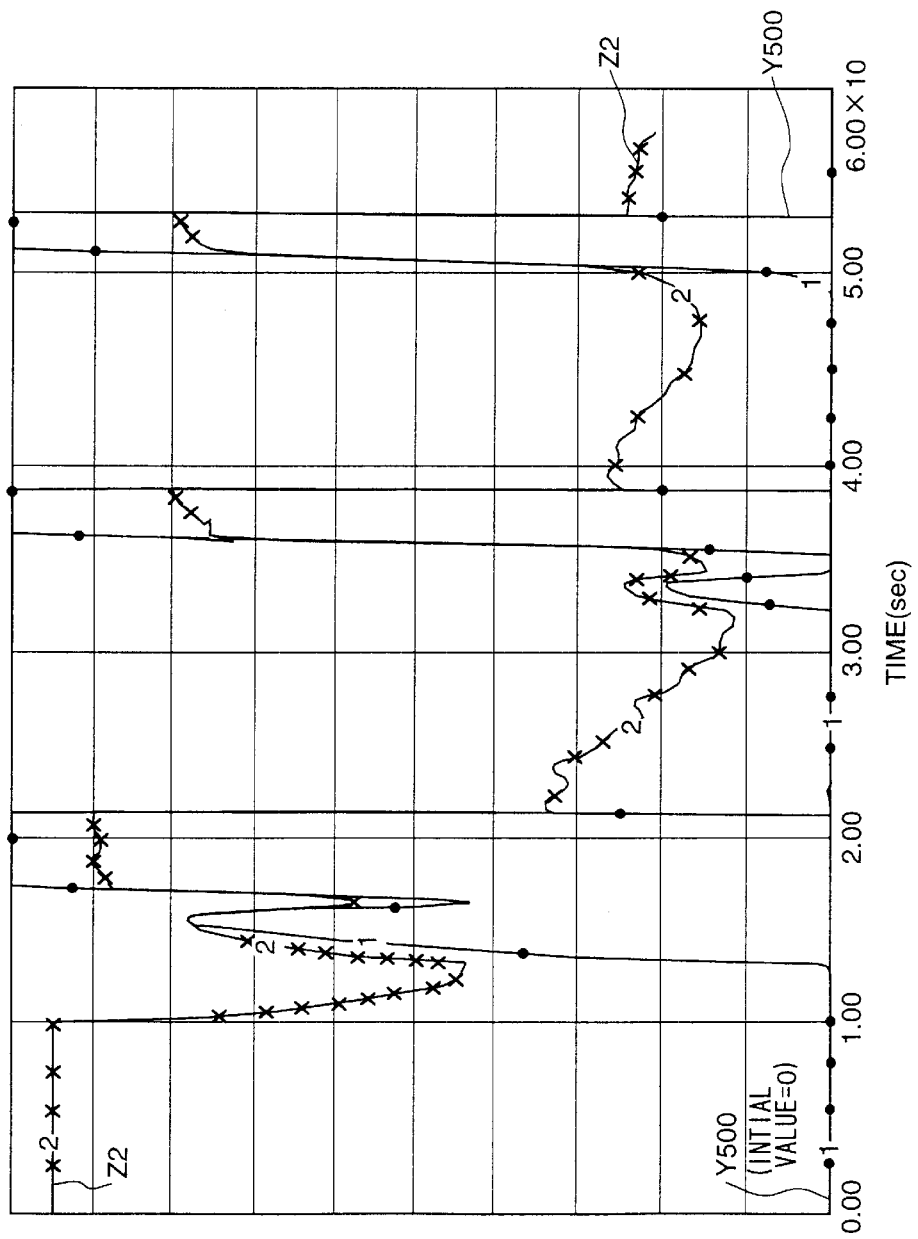
FIG. 31 is an operational chart of the correction limiting circuit in a third embodiment of the present invention.

FIG. 25 shows a schematic block diagram of an embodiment of the correction-control means 500 in the governor of FIG. 24.

The correction-control circuit receives an Xn speed detection signal and outputs Y500. The correction control circuit 500 contains an adder 509 and an integrator 510. At the start of a load rejection, the integrator 510 has an initial value of 1.0 which is equivalent to the rated rotational speed. The output X509 of the adder 509 is an incomplete differentiation of Xn. You can tell by X509 whether dN/dt is positive (increasing speed) or negative (decreasing speed).

A switch circuit 511 outputs 1.0 when X509 is positive and 0 when X509 is negative. A circuit 501 works as a passivity element which passes only Xn that is greater than a preset value Xc1. The value Xc1 should be greater than Xn=0.1 which is equivalent to the rated speed and cannot be obtained in the normal operation in which the generator motor is connected to the electric power system and can be obtained only when a load is rejected. For example, the value Xc1 to be set is 1.04 to 1.05. The adder 502 adds the signal X504 to the signal X501. A relay element 503 outputs a signal X502 coming from an adder 502 when the output X511 of the switch 511 is positive or a zero when the output X511 of the switch 511 is negative. An integrator 504 receives a signal X503 output from the relay element 503. With these, a response of the signal X504 to the signal X501 is a first order lag response of a time constant 1/Kc1 (and gain 1) while the rotational speed is increasing or remains unchanged on a value (which is just before the speed starts to decrease) while the speed is decreasing.

A circuit 505 is an adder. A relay element 506 outputs a signal X505 coming from the adder 505 when the output X511 of the switch 511 is negative or a zero when the output X511 of the switch 511 is positive. An integrator 507 receives a signal X506 coming from the relay element 506. With these, a response of the signal X505 to the signal X504 is an incomplete differentiation which slowly decreases the signal X504 exponentially while the speed is decreasing. Its time constant is 1/Kc3 and the gain is 1. On the other hand, as the value of the signal X504 increases while the speed is increasing and the signal X507 retains a value just before the speed starts to increase, the value of the signal 505 increases. In other words, the value of the signal X505 increases as the speed is increasing and slowly decreases exponentially when the speed starts to decrease. This is equivalent to the speed change model curve upon a load rejection.

A comparator 508 compares the signal X505 (a model curve) and the signal X501 (actual speed curve). A saturation element 512 saturates a signal X508 if the signal I under −Kc5 and over +Kc4. An adder 513, a proportional element 514, and an integration element 515 constitute an incomplete differentiation circuit of a time constant 1/(Kc6, Kc7) and a gain Kc6. In other words, if the difference between the speed change model curve upon a load rejection and the actual speed curve exceeds a predetermined value, a signal X514 generates. The first order lag element 516 receives this signal X514, truncates it, and outputs it as a signal X516. A saturating element 517 receives the output X516 of the first order lag element 516 and stops the signal X516 when the value of the signal X516 is under zero or limits the signal at K×10 when the value of the signal X516 is Kc10 or more. "Stopping the signal X516 when the value of the signal X516 is under zero" is made because the vane opening correction on a load rejection is effective only on the positive side of a signal. Experimentally, we, the inventors of the present invention, have known that the vane opening correction on the positive side should be minimized as low as possible and that the natural control of the governor should be made use of as much as possible to avoid unwanted interferences.

Therefore, the saturating element also saturates the positive side of the signal. A switch circuit 518 outputs 1 when the value Xn is greater than the value Xc2 or 0 (Xn>Xc2) when the value Xn is smaller than the value Xc2 (Xn>Xc2). A circuit 519 is a kind of relay which fetches a signal X517 and corrects the vane opening only when the output of the switch 518 is 1 (Xn>Xc2) or fetches 0 and stops the vane opening correction when Xn<Xc2. The vane opening correction-control works singly to open the guide vanes. However, in some cases, the vane closing by the governor is delayed and consequently, the speed decreasing may be delayed. The switch 518 and the relay 519 are provided to prevent this delay.

Figure 32:
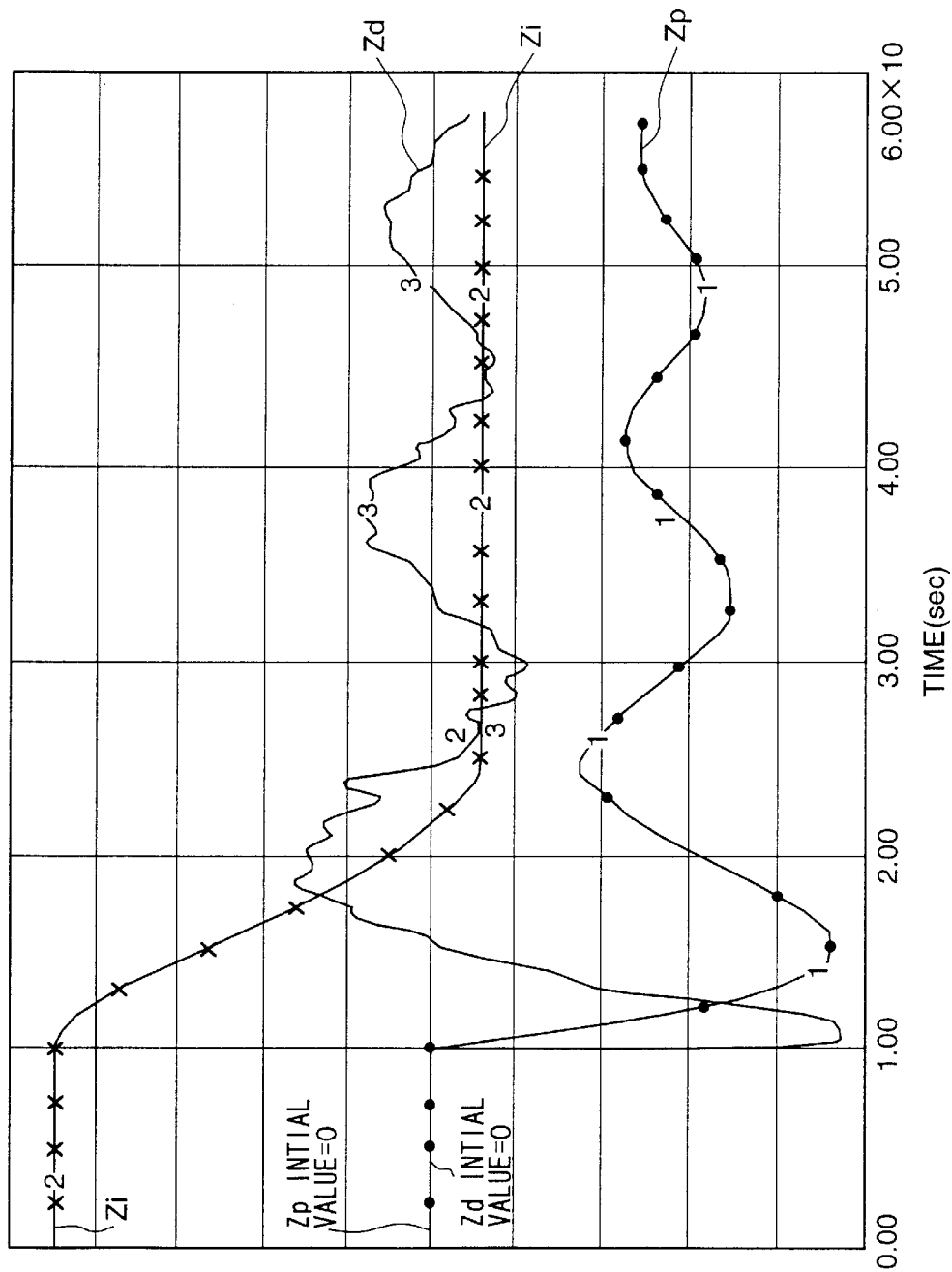
FIG. 32 is an operational chart of the whole system in a third embodiment of the present invention.
Figure 33:
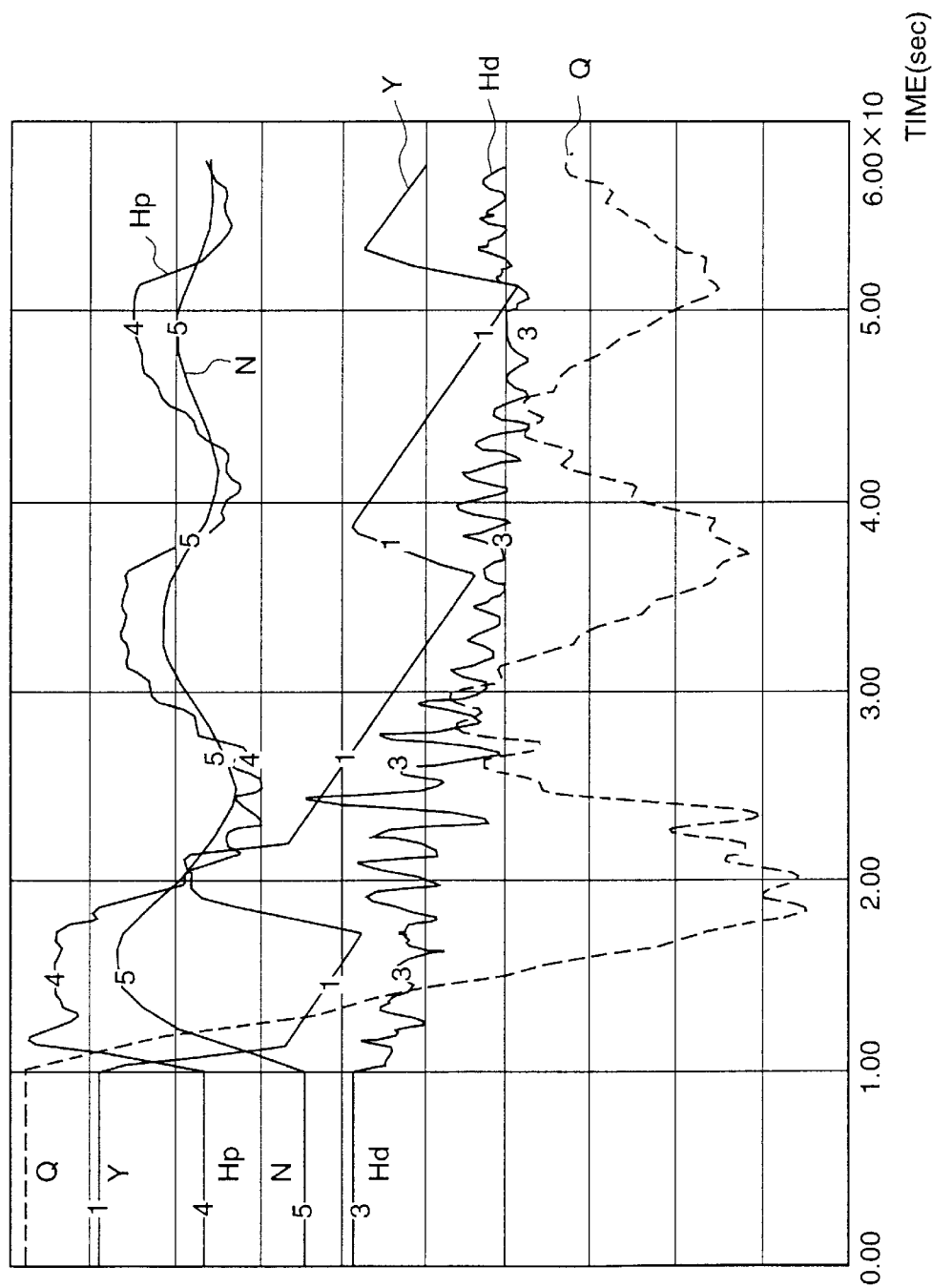
FIG. 33 is a chart of time response upon a load rejection in a third embodiment of the present invention.
Figure 34:
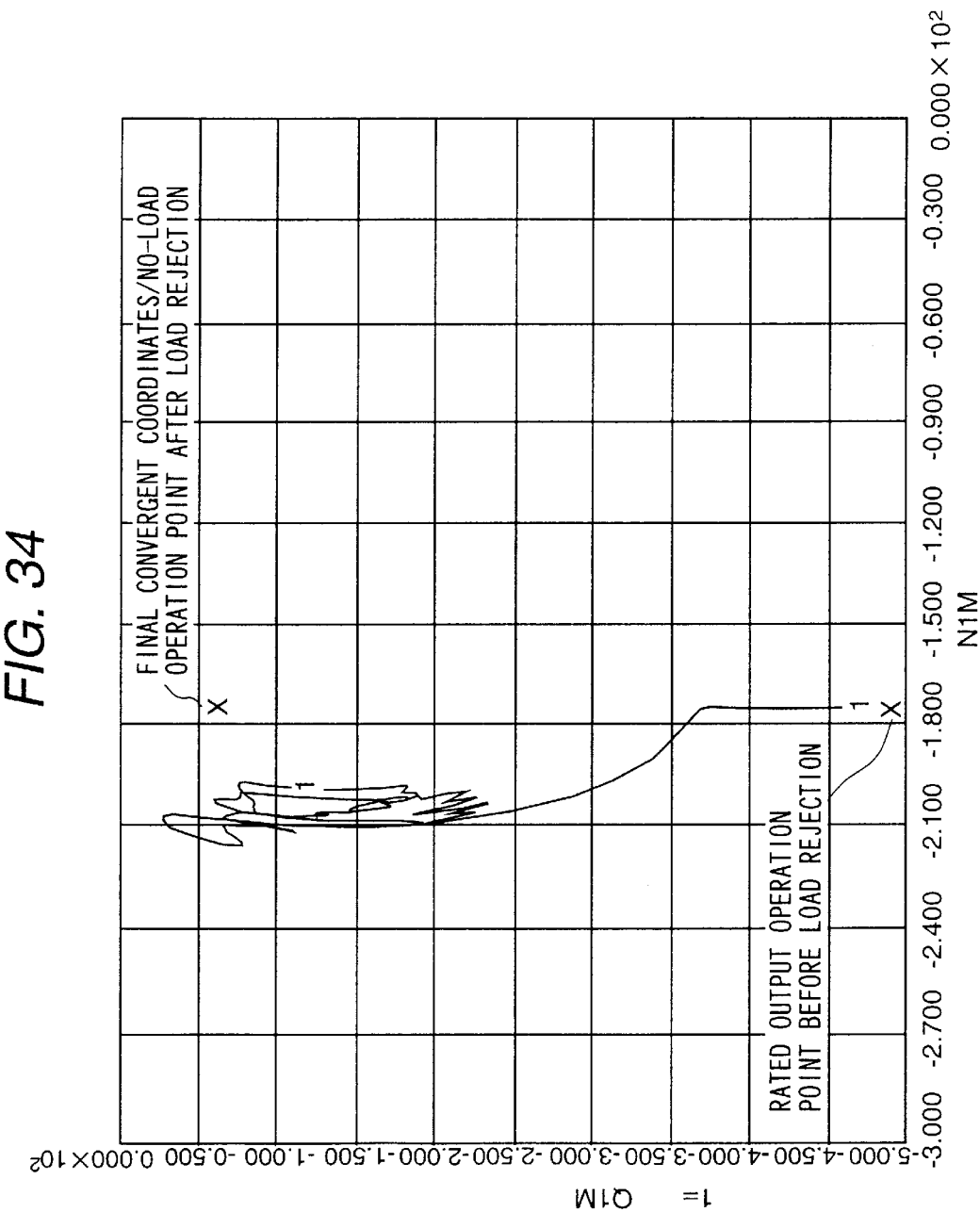
FIG. 34 is a graph explaining the unit-discharge versus unit-speed trajectory of the pump turbine in a third embodiment of the present invention.

FIG. 33 shows a time response of a pump turbine which employs the governor of FIG. 24 and FIG. 25. Symbols Y, N, Q, Hp, and Hd in FIG. 33 respectively indicate the vane opening, the rotational speed, the discharge, the turbine inlet water pressure, and turbine outlet water pressure in that order. The guide vanes are correction-controlled to open during speed decreasing. Even in the first speed decrease after a load rejection, the rotational speed never goes straight down to a speed value preset by the governor (that is, a total of the rated speed and the speed control rate). Simultaneously, the discharge attenuates towards a non-load discharge smoothly without a temporary counterflow (pump-running flow). FIG. 34 shows how the running point of the pump turbine behaves on the N1-vs-Q1 complete characteristics upon a load rejection. From this movement (locus), it is easily understood that the vibration specific to the S-characteristics (which makes the discharge swing before and after the non-load operation) is greatly suppressed. FIG. 26 to FIG. 31 show the behavior of each component of the vane correction-control circuit of FIG. 25 which extracts responses of FIG. 33 and FIG. 34. FIG. 32 shows the output of each operational element of the PID governor in this status. In other words, the final vane opening command signal is the sum of the output of each operation element of FIG. 31 and the correction-control signal Y500.

In case of an emergency stop, the governor quickly closes the guide vanes with Yε1 unconditionally set to −θL or less after the operation in the S-characteristics region due to a speed rise fully converges although this is not visible in FIG. 24.

"after the operation in the S-characteristics region due to a speed rise fully" is substantially recognized by the rotational speed below a predetermined value or the vane opening below a predetermined value.

In each of the aforementioned embodiments, it is preferable to adjust the guide vanes to smoothly open the fast-closing guide vanes, to reduce the upstream penstock water pressure (which has risen during fast vane closing immediately after a load rejection) by the water-pressure increasing effect due to the speed rise and the vane opening effect, and thus to retain the speed at approximately the same speed value. This method may be one of the most rational methods of reducing the upstream penstock water pressure.

There are two ways of causing the guide vanes (which are closing during a speed rise after a load rejection) to stop closing and starts opening at optimum timing: a method of increasing the target rotational speed of the governor and a method of decreasing the integration or proportion gain of the PID operation blocks. Each of the aforementioned embodiments can use these methods singly or in combination.

What we claim is:

1. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein, upon a load rejection which shuts off said generator motor from an electric power system, said governor is controlled to make a target speed value of said runner after a load rejection higher than a target speed value before said load rejection; said target speed value being a reference speed to be compared with actual speed so that said governor determines when and/or how to open or to close said water discharge controller in response to a balance between the two speeds.

2. A pump turbine comprising a runner, a shaft for transferring a torque of said runner to a generator motor, a water discharge controller for adjusting the quantity of water passing through said runner, and a governor for detecting a rotational speed of said runner and controlling said water discharge controller to set the rotational speed of said runner to a predetermined value in a steady state condition; wherein, upon a load rejection which shuts off said generator motor from an electric power system, said governor is controlled to make a target speed value of said runner only in the transient status immediately after a load rejection substantially higher than a target speed value in a steady status; said target speed value being a reference speed to be compared with actual speed so that said governor determines when and/or how to open or to close said water discharge controller in response to a balance between the two speeds.

3. A pump turbine according to claim 2; wherein said governor is controlled to increase the predetermined speed of said governor in a transient status immediately after a load rejection.

4. A pump turbine according to claim 3, wherein a preset speed value increases along a speed increasing curve from a point below said curve while the speed is increasing immediately after a load rejection so that said governor does not start to open said water discharge controller prematurely in said speed increasing stage but opens timely in a later stage of said speed increasing curve or as soon as the speed turns to a decrease.

5. A pump turbine according to claim 2; wherein said pump turbine comprises a correction-controller which subjects said governor to correction-control to substantially increase the target speed value as the speed increases immediately after a load rejection, gradually cancels said correction-control after the speed turns to decrease, and cancels said correction-control substantially completely when the speed is in the steady status.

6. A pump turbine according to claim 5, wherein said governor limits a closing rate of said water discharge controller to predetermined values according to an opening of said water discharge controller, limits said closing rate of said water discharge controller to a second predetermined value or below which is comparatively high while said opening of said water discharge controller is at a first predetermined value or above, and limits said closing rate to a third predetermined value or below which is comparatively low after said opening of said water discharge controller is below said first predetermined value, and wherein said correction-control does not obstruct the natural action of said governor to close said discharge controller at least until the opening of said discharge controller reaches said first predetermined value or below.

7. A pump turbine according to claim 6, wherein said correction-controller temporarily opens said discharge controller after a load rejection is closed down to said first predetermined value or below and the rate of closing said discharge controller is changed to said third predetermined value or below.

8. A pump turbine according to claim 7; wherein a signal for said correction-control is adjusted so that the temporary opening of the discharge controller may start earlier than the increase of the rotational speed immediately after a load rejection stops.

9. A pump turbine according to claim 5, wherein said correction-controller gives a bias signal to raise said target speed value to said governor temporarily in a later stage of a speed increasing phase or in an earlier stage of a speed decreasing phase.

10. A pump turbine according to claim 2, further comprising means to set a target speed command signal for the steady status and a correction-control means which receives a speed signal and outputs a signal to substantially correct said target speed command signal in a transient status.

11. A pump turbine according to claim 10, wherein said correction control means comprises a first arithmetic unit which passes a rotational speed signal when the rotational speed exceeds a predetermined value, a second arithmetic unit which receives a signal output from said first arithmetic unit and outputs a signal which increases while the received signal is increasing in comparatively quick response to the received signal and decrease slowly as soon as the received signal turns to decrease in comparatively slow response to the received signal, and a correction control unit which corrects said target speed command signal according to the output of said second arithmetic unit.

12. A pump turbine according to claim 11; wherein said predetermined speed value is set greater than the maximum speed value which occurs in the normal operation of said pump turbine in which said generator motor is connected to an electric power system.

13. A pump turbine according to claim 11, wherein said second arithmetic unit makes a first order lag response of a comparatively short time constant while a signal output from the first arithmetic unit is increasing, or a first order lag response of a comparatively long time constant while said signal output from the first arithmetic unit is decreasing.

14. A pump turbine according to claim 11, wherein said second arithmetic unit makes a first order lag response of a comparatively short time constant while a signal output from the first arithmetic unit is increasing and, as soon as a speed signal from said first arithmetic unit turns to decrease, makes a response which attenuates along an attenuating curve of a comparatively long time constant relative to the output before the speed starts to decrease.

15. A pump turbine according to claim 10; wherein said governor of a PID arithmetic type (P for proportion, I for integration, and D for differentiation) adds said correction signals prior to all P, I, and D operations.

16. A pump turbine according to claim 10; wherein said governor of a PID arithmetic type (P for proportion, I for integration, and D for differentiation) adds said correction signals to have effects only upon P and I operations.

17. A pump turbine according to claim 2, further comprising a correction-controller for giving a bias signal to raise said target speed value to said governor temporarily in a later stage of a speed increasing phase or in an earlier stage of a speed decreasing phase.

18. A pump turbine comprising a runner, a shaft which transmits a torque of said runner to a generator motor, and a discharge controller which controls the quantity of water passing through said runner and capable of working in both Pump-up and Power Generation modes by switching the rotational direction of said runner; wherein said pump turbine further comprises a first governor which monitors the rotational speed of said runner in the Power Generation mode and controls the discharge controller to settle the rotational speed of the runner to a predetermined value in steady state condition and a second governor which controls the discharge controller in place of said first governor upon a load rejection which shuts off the generator motor from an electric power system and wherein the target rotational speed of said second governor is substantially higher than the target rotational speed of said first governor in the transient status at least just after a load rejection.

19. A pump turbine comprising a runner connected to a generator motor, a discharge controller which controls the quantity of water passing through said runner, and a governor which detects a rotational speed of said runner and controls said discharge controller to set the rotational speed of said runner to a predetermined value; wherein said discharge controller is closed after a load rejection and then reversed to open temporarily at least once so that the water flow is not reversed transiently even upon a rejection of a full load or nearly a full load.

20. A pump turbine comprising a runner connected to a generator motor, a discharge controller which controls the quantity of water passing through said runner, and a governor which detects a rotational speed of said runner and controls said discharge controller to set the rotational speed of said runner to a predetermined value; wherein said discharge controller is closed after a load rejection and then reversed to open temporarily at least once so that the water flow is not reversed transiently even upon a rejection of a full load or nearly a full load and so that a subsequent time period for the rotational speed returning to go down to said predetermined value by said governor is longer than a time period for the rotational speed increasing after a load rejection to arrive at a peak value.

21. A pump turbine comprising a runner connected to a generator motor, a discharge controller which controls the quantity of water passing through said runner, and a governor which detects a rotational speed of said runner and controls said discharge controller to set the rotational speed of said runner to a predetermined value; wherein said pump turbine further comprises a correction-controller for opening said discharge controller which is being controlled to close by said governor while the speed is decreasing in an accelerating manner over a peak immediately after a load rejection in the Power Generation mode.

22. A pump turbine according to claim 21; wherein, when the speed turns to increase, the opening operation by said correction-controller stops and said governor resumes to substantially control said discharge controller.

23. A pump turbine according to claim 22; herein correction control by said correction-controller repeats the set of decreasing, stopping, and increasing of the rotational speed several times before the rotational speed after the full load rejection reaches a value preset by the governor.

24. A pump turbine according to claim 22, wherein said correction controller decelerates and stops the first reduction of the speed on the way into a first bottom during the first reduction of the rotational speed after the first peak upon a load rejection, turns the speed to increase, decelerates and stops the speed into a second peak, and turns the speed to decrease again; and wherein said correction-control adjusts to make said second peak value lower than said first peak value.

25. A pump turbine according to claim 21; wherein, correction control by said correction-controller to temporarily open the discharge controller starts when the rotational speed turns to decrease after a load rejection and continues to a point (connection point) where the rotational speed curve changes from a convex curve to a concave curve.

26. A pump turbine according to claim 21; wherein correction control by said correction-controller to open the discharge controller starts just before the rotational speed turns to decrease after a load rejection and continues to an inflection point where the rotational speed curve changes from a convex curve to a concave curve.

27. A pump turbine according to claim 21; wherein correction control by said correction-controller is made to stop the first speed decrease after a full load rejection at a rotational speed point which is above the rated rotational speed at least one third of the difference between the rated rotational speed and the peak rotational speed and turns to increase the rotational speed from there.

28. A pump turbine according to claim 21; wherein said governor comprises a closing speed limiter which limits the rate of closing said discharge controller according to the opening of said discharge controller to a second predetermined value or below which is comparatively high when the opening of said discharge controller is at a first predetermined value or above or to a third predetermined value or below which is comparatively low when the opening of said discharge controller is at a first predetermined value or below; wherein correction-control by said correction-controller is disabled while the opening of said discharge controller is at said first predetermined value or above.

29. A pump turbine according to claim 21, wherein correction-control by said correction-controller adjusts to temporarily turn the speed which is decreasing after a load rejection to increase at least once so that the rotational speed may not decrease straight to a value predetermined by said governor from said peak value.

30. A pump turbine according to claim 21, wherein said governor comprises means which detects a rotational speed, means which sets a target rotational speed, arithmetic means which enters a signal of a difference between a target speed command signal from said target rotational speed setting means and an actual speed signal from said rotational speed detecting means and outputs an opening command signal to said discharge controller and amplifying means which operates said discharge controller according to the output of said arithmetic means, wherein said correction-controller enters at least a speed signal and a correction-control to open on said output of the arithmetic means.

31. A pump turbine according to claim 30, wherein said correction-controller to work on said output of the arithmetic means comprises a first arithmetic unit which outputs a rotational speed signal only when the rotational speed exceeds a predetermined value, a second arithmetic unit which receives a signal output from the first arithmetic unit and outputs a signal (target signal) which increases quickly in comparatively quick response to the received signal while the received signal is increasing and decreases slowly in comparatively slow response to the received signal when the received signal starts to decrease, a comparator which compares the target signal and the signal output from the first arithmetic unit and outputs the result (a difference), a first limiting element which limits the positive component of the signal output from the comparator, a differential element which incompletely differentiates the signal output from the first limiting element, and a second limiting element which blocks the negative components of a signal output from the differential element and limits the positive components of the signal at a predetermined value.

32. A pump turbine according to claim 31; wherein said predetermined speed value is set greater than the maximum speed value which occurs in the normal operation of said pump turbine in which said generator motor is connected to an electric power system.

33. A pump turbine according to claim 31; wherein said second arithmetic unit makes a first order lag response of a comparatively short time constant while a signal output from said first arithmetic unit is increasing or a response, after the speed starts to decrease, which attenuates along an attenuating curve of a comparatively long time constant relative to the output before the speed starts to decrease.

34. A pump turbine according to claim 31; wherein the output of said second arithmetic unit is approximately constant in individual operating cycles between starting and resetting.

35. A pump turbine according to claim 30, wherein said correction-control means gives some opening bias signals to said governor temporarily in a later stage of a speed increasing phase or in an earlier stage of a speed decreasing phase.

36. A pump turbine according to claim 21, wherein said correction-controller gives some opening bias signals to said governor temporarily in a later stage of a speed increasing phase or in an earlier stage of a speed decreasing phase.

37. A method of immediately stopping, in case of emergency, a pump turbine which comprises a runner connected to a generator motor, a water discharge controller for adjusting the quantity of water passing through said runner, a governor for detecting a rotational speed of said runner and controlling said water discharge controller and a correction-controller for giving some opening bias signals to said governor temporarily in a later stage of a speed increasing phase or in an earlier stage of a speed decreasing phase and which is running in the power generation mode; wherein said method comprises the steps of keeping both the governor and the correction-controller operative at least initially in the emergency stop process, fully closing said discharge controller and stopping the revolution of the pump turbine.

38. A method of immediately stopping, in case of emergency, a pump turbine which comprises a runner connected to a generator motor, a water discharge controller for adjusting the quantity of water passing through said runner, a governor for detecting a rotational speed of said runner and controlling said water discharge controller and a correction-controller for giving some opening bias signals to said governor temporarily in a later stage of a speed increasing phase or in an earlier stage of a speed decreasing phase and which is running in the power generation mode; wherein said method comprises the steps of keeping both the governor and the correction-controller operative at least initially in the emergency stop process, attenuating the undesirable influence of the S characteristics, fully closing said discharge controller and stopping the revolution of the pump turbine.

39. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner, and a correction controller giving a bias signal for control of said governor in the opening direction temporarily in a later stage each of some successive speed increasing phases and/or in an earlier stage each of some successive speed decreasing phases after load rejection; wherein a set of operations to close and open said discharge controller is repeated several time in the transient state after load rejection.

40. A pump turbine according to claim 39; wherein the opening of said discharge controller is made smaller each time a set of operations to close and open said discharge controller is carried out.

41. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein a means is provided by which the decreasing rate of the speed to return to the rated speed subsequent to its increasing after a load rejection is made adjustable independently from ordinary adjustment or control of said governor.

42. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein the target rotational speed of said governor at each instant which is to be compared with actual speed at each instant is raised relatively quickly to follow the actual speed in said speed increasing step and lowered relatively slowly to be followed by the actual rotational speed accordingly in said speed decreasing step upon a load rejection which shuts off said generator motor from an electric power system.

43. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein said governor is controlled to make the movement of the opening of said discharge controller draw a convex curve for a temporary opening at least when said rotational speed reaches the first peak or its vicinity upon a load rejection which shuts off said generator motor from an electric power system.

44. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein the criteria of said governor to operate said discharge controller to open or close in response to the detected rotational speed is temporarily adjusted as a function of the detected speed so that said discharge reduction rate is made smaller in a convex curve of said rotational speed or its vicinity upon a load rejection.

45. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein criteria of said governor to operate said discharge controller to open or close in response to the detected rotational speed is temporarily adjusted as a function of the detected speed so that said discharge controller is opened temporarily at least once before or while the speed decreasing subsequent to the speed increasing after a load rejection is proceeding in an accelerating manner and a flow reversal.after the load rejection is prevented.

46. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein criteria of said governor to operate said discharge controller to open or close in response to the detected rotational speed is temporarily adjusted as a function of the detected speed so that said discharge controller is opened temporarily at least once before or while the speed decreasing subsequent to the speed increasing after a load rejection is proceeding in an accelerating manner and the time period for the rotational speed returning to go down to said predetermined value is longer than the time period for the rotational speed increasing after a load rejection to arrive a peak value.

47. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein criteria of said governor to operate said discharge controller to open or close in response to the detected rotational speed is temporarily adjusted as a function of the detected speed so that said discharge controller is opened temporarily at least once before or while the speed decreasing subsequent to the speed increasing after a load rejection is proceeding in an accelerating manner and an upstream water hammering peak which occurs immediately after the rotational speed of said runner turns to decrease is eliminated.

48. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein said governor further comprises a correction signal generator which supplies a correction value to said governor and said correction signal generator supplies a correction value to said governor so that the time period for the rotational speed returning to go down to said predetermined valve is longer than the time period for the rotational speed increasing after a load rejection to arrive at a peak value.

49. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein said governor further comprises a correction signal generator which supplies a correction value to said governor and said correction signal generator supplies a correction value to said governor to eliminate an upstream water hammering peak which occurs immediately after the rotational speed of said runner turns to decrease by temporarily opening said discharge controller at least once before or while the speed decreasing subsequent to the speed increasing after a load rejection is proceeding in an accelerating pattern.

50. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein criteria of said governor to operate said discharge controller to open or close in response to the detected rotational speed is temporarily adjusted as a function of the detected speed so that said discharge controller is closed immediately after a load rejection and then reversed to open temporarily during the closing at least once and the upstream penstock pressure is maintained nearly at a level as caused by the initial closing of said water discharge controller thereafter approximately until the speed decreasing subsequent to the speed increasing after a load rejection is proceeding in an acceleration manner.

51. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein said governor further comprises a correction signal generator which outputs a value to correct a signal output from said governor and said correction signal generator outputs a correction value so that the time period for the rotational speed returning to go down to said predetermined value is longer than the time period for the rotational speed increasing after a load rejection to arrive at a peak value.

52. A pump turbine comprising a runner connected to a generator motor, a water discharge controller for adjusting the quantity of water passing through said runner, and a governor for detecting a rotational speed of said runner and controlling said water discharge controller to get a predetermined rotational speed of said runner; wherein said governor further comprises a correction signal generator which outputs a value to correct a signal output from said governor and said correction signal generator outputs a correction value to eliminate an upstream water hammering peak which occurs immediately after the rotational speed of said runner turns to decrease by temporarily opening said discharge controller at least once before or while the speed decreasing subsequent to the speed increasing after a load rejection is proceeding in an accelerating pattern.

* * * * *